United States Patent
Kikuchi et al.

(10) Patent No.: US 6,182,057 B1
(45) Date of Patent: Jan. 30, 2001

(54) DEVICE, METHOD, AND PROGRAM STORAGE MEDIUM FOR EXECUTING GENETIC ALGORITHM

(75) Inventors: Yasuhiro Kikuchi; Hirofumi Doi, both of Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 08/990,050

(22) Filed: Dec. 12, 1997

(30) Foreign Application Priority Data

Dec. 12, 1996 (JP) .................................................... 8-331999
Dec. 8, 1997 (JP) .................................................... 9-337535

(51) Int. Cl.[7] .................................................... G06F 15/18
(52) U.S. Cl. ................................................................ 706/13
(58) Field of Search .................................................. 706/13

(56) References Cited

U.S. PATENT DOCUMENTS

| | | | |
|---|---|---|---|
| 5,148,513 | * 9/1992 | Koza et al. | 706/13 |
| 5,319,781 | * 6/1994 | Syswerda | 706/13 |
| 5,793,644 | * 8/1998 | Koford et al. | 706/13 |
| 5,819,244 | * 10/1998 | Smith | 706/13 |
| 5,848,403 | * 12/1998 | Gabriner et al. | 706/13 |
| 5,940,533 | * 8/1999 | Gentric | 706/13 |
| 5,974,355 | * 10/1999 | Matsumoto et al. | 701/120 |
| 5,978,507 | * 11/1999 | Snackleton et al. | 382/195 |

OTHER PUBLICATIONS

Nakata et al., "Image Reconstruction from Projections Using a Genetic Algorithm", IEEE Nuclear Science Symposium and Medical Imaging Conference, Oct.–No. 1994.*

Saito et al., "Shape Modeling of Multiple Objects from Shading Images Using Genetic Algorithms", IEEE Inter. Conf. on Systems, Man and Cybernetics, Oct. 1996.*

Tompkins et al., "Genetic Algorithms in Optimizing Simulated Systems", IEEE Proceedings of the 1995 Winter Simulation Conference, 1995.*

Binglin et al., "A Genetic Algorithm for Diagnosis Problem solving", IEEE International Conference On Systems, Man and Cybernetics, Oct. 1993.*

Haida, "Genetic Algorithms Approch to Voltage Optimization", IEEE Pproceedings of the 1st Inter—forum on Applications of Neural Networks to Power Systems, Jul. 1991.*

Skomorokhov, Alexander, "Genetic Algorithms=APL2 Implementation and a Real Life Application", Proceedings of the APLm96 Conf. on Designing the Future, Aug. 1996.*

Logar et al, "Implementation of Massively Parallel Genetic Algorthms on the Maspar MP–1", Proceedings of the 1992 ACM/SIGAPP Symposium on Applied Computing (vol.–II), Mar. 1992.*

Shimodaria, Hisashi, A New Genetic Algorithm Using Large Mutation Rates and Population–Elitist Selection (GALME) IEEE Proceedings of 8th Inter. Conf. on Tools with Artificial Intel., Nov. 1996.*

D. Goldberg, "Gentic Algorithms in Search Optimization, and Machine Learning", A Gentle Introduction to Gentle Algorithms, January 1989, pp. 1–25.

Juric, Mark, "Opotimizing Genetic Algorithm Parameters for Multiple Fault Diagnosis Applications", IEEE Proceedings of the 10th Conference on Artificial Intelligence for Applications., Mar. 1994.*

\* cited by examiner

*Primary Examiner*—Tariq R. Hafiz
*Assistant Examiner*—George Davis
(74) *Attorney, Agent, or Firm*—Staas & Halsey

(57) ABSTRACT

A genetic algorithm executing device, in which search of a genetic algorithm is improved, sets a distribution of characters at each position of character strings represent candidates of solution, obtain the degree of disorder at each position by the distributions of characters, set a larger mutation rate at the position of which degree of disorder is higher. This device performs a mutation operation on the character strings according to the mutation rates. This device generates the new character strings by selecting positions of which degrees of disorder are higher than a predetermined value, and changing the character at the selected positions.

26 Claims, 24 Drawing Sheets

EXAMPLE OF DEGREE OF DISORDER FUNCTION

FIG. 5A

NUMBER OF CHARACTER POSITIONS (L) : 4

AVAILABLE CHARACTER (a) : 0, 1

DEGREE OF DISORDER FUNCTION $R_j$ :

$6 - 5 \times |\text{RATIO OF "0"} - 0.5| - 5 \times |\text{RATIO OF "1"} - 0.5|$ ($|\cdots|$ INDICATES ABSOLUTE VALUE)

VALUES OF "$R_j$" CORRESPONDING TO RATIOS OF CHARACTERS "0" AND "1"
($r_j$ : DEGREE OF DISORDER)

FIG. 5B

| RATIO OF "0" | 0.0 | 0.1 | 0.2 | 0.3 | 0.4 | 0.5 |
|---|---|---|---|---|---|---|
| RATIO OF "1" | 1.0 | 0.9 | 0.8 | 0.7 | 0.6 | 0.5 |
| VALUE OF "r" | 1 | 2 | 3 | 4 | 5 | 6 |

| RATIO OF "0" | 0.6 | 0.7 | 0.8 | 0.9 | 1.0 |
|---|---|---|---|---|---|
| RATIO OF "1" | 0.4 | 0.3 | 0.2 | 0.1 | 0.0 |
| VALUE OF "$r_j$" | 5 | 4 | 3 | 2 | 1 |

FIG. 5C

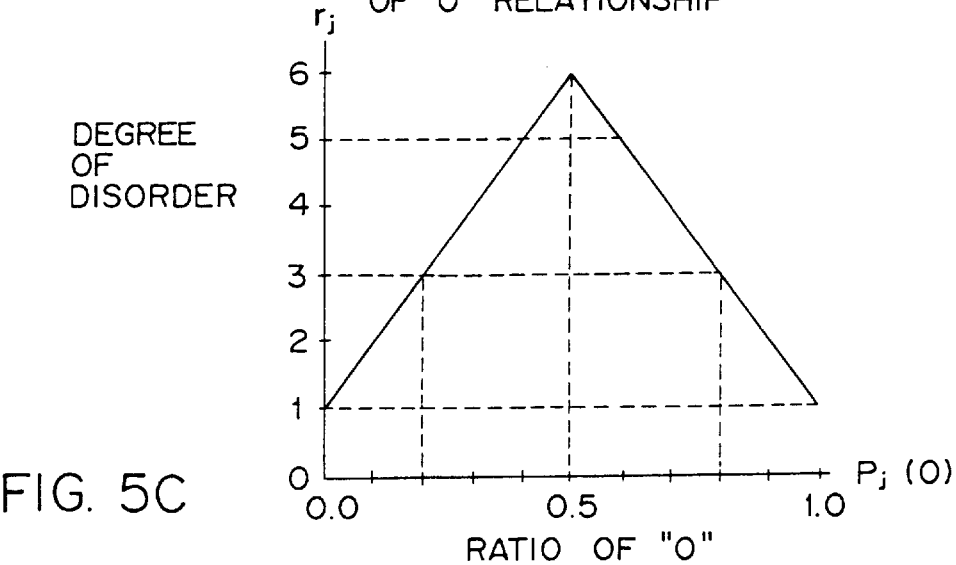

DEGREE OF DISORDER TO RATIO OF "0" RELATIONSHIP

| CHARACTER POSITION | 1 | 2 | 3 | 4 |
|---|---|---|---|---|
| SOLUTION CANDIDATE GROUP (TOTAL NUMBER = 10) | 1 | 0 | 0 | 1 |
| | 0 | 1 | 0 | 0 |
| | 0 | 0 | 0 | 1 |
| | 0 | 1 | 0 | 1 |
| | 0 | 1 | 0 | 1 |
| | 0 | 0 | 0 | 0 |
| | 0 | 0 | 0 | 1 |
| | 1 | 1 | 0 | 1 |
| | 0 | 0 | 0 | 1 |
| | 0 | 1 | 0 | 0 |
| RATIO OF "0" | 8/10 | 5/10 | 10/10 | 3/10 |
| RATIO OF "1" | 2/10 | 5/10 | 0/10 | 7/10 |
| VALUE OF "r" | 3 | 6 | 1 | 4 |

FIG. 6

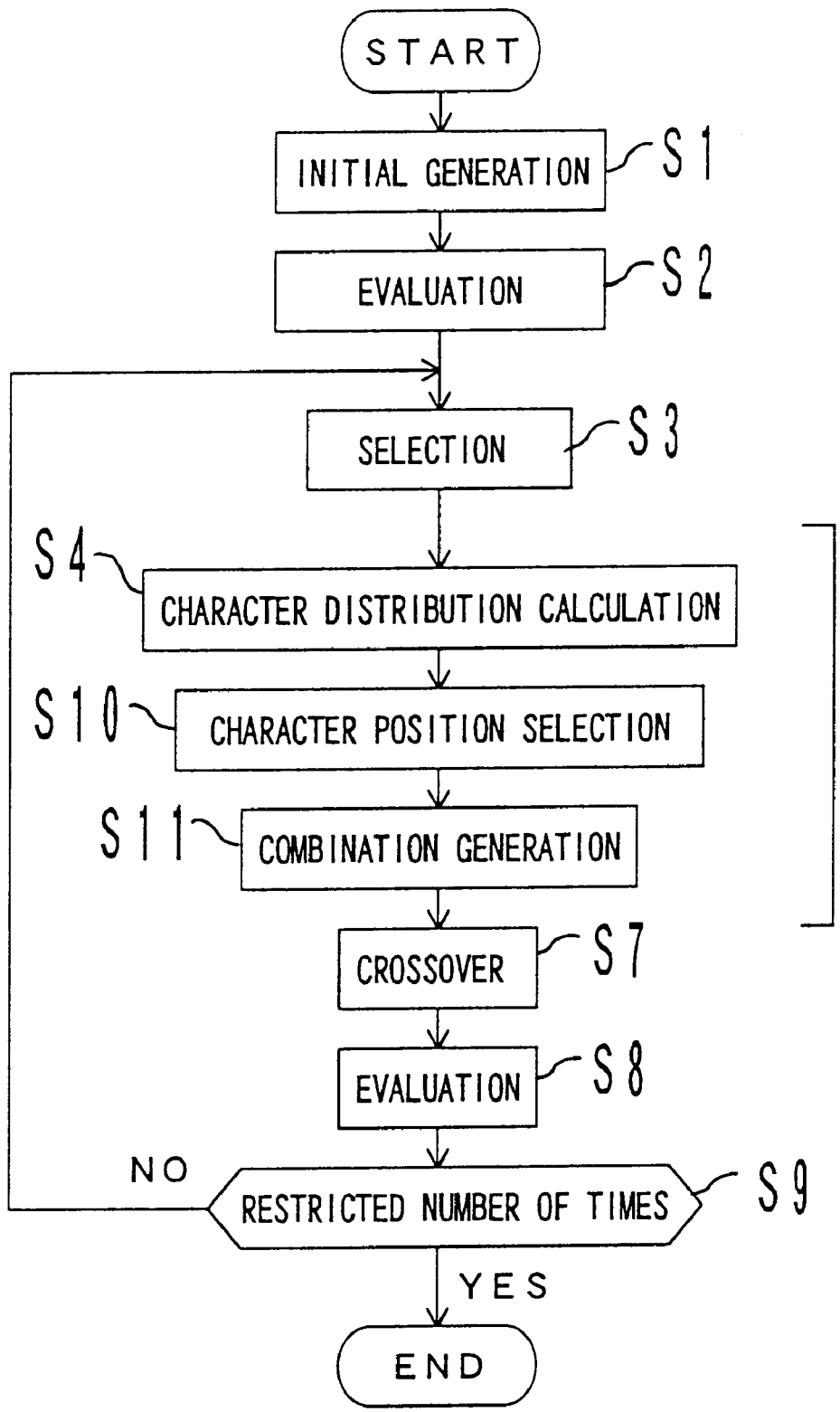
F I G. 9

| NUMBER | CAPACITY | PRICE | SOLUTION | NUMBER | CAPACITY | PRICE | SOLUTION |
|---|---|---|---|---|---|---|---|
| 1 | 12 | 99 | 1 | 26 | 91 | 80 | 1 |
| 2 | 11 | 76 | 1 | 27 | 45 | 39 | 0 |
| 3 | 20 | 102 | 1 | 28 | 106 | 91 | 1 |
| 4 | 21 | 106 | 1 | 29 | 109 | 93 | 1 |
| 5 | 24 | 91 | 1 | 30 | 88 | 70 | 0 |
| 6 | 11 | 27 | 1 | 31 | 63 | 49 | 1 |
| 7 | 22 | 50 | 1 | 32 | 84 | 65 | 0 |
| 8 | 32 | 71 | 1 | 33 | 30 | 23 | 0 |
| 9 | 46 | 101 | 1 | 34 | 109 | 75 | 0 |
| 10 | 32 | 65 | 1 | 35 | 32 | 19 | 0 |
| 11 | 51 | 98 | 1 | 36 | 85 | 47 | 0 |
| 12 | 27 | 50 | 1 | 37 | 63 | 34 | 0 |
| 13 | 37 | 67 | 1 | 38 | 97 | 52 | 0 |
| 14 | 63 | 100 | 1 | 39 | 102 | 49 | 0 |
| 15 | 48 | 64 | 1 | 40 | 108 | 47 | 0 |
| 16 | 40 | 52 | 1 | 41 | 81 | 35 | 0 |
| 17 | 60 | 76 | 1 | 42 | 85 | 35 | 0 |
| 18 | 66 | 83 | 1 | 43 | 63 | 25 | 0 |
| 19 | 72 | 83 | 1 | 44 | 102 | 38 | 0 |
| 20 | 82 | 94 | 1 | 45 | 84 | 29 | 0 |
| 21 | 92 | 105 | 1 | 46 | 108 | 34 | 0 |
| 22 | 46 | 52 | 1 | 47 | 101 | 25 | 0 |
| 23 | 56 | 57 | 1 | 48 | 80 | 17 | 0 |
| 24 | 90 | 86 | 1 | 49 | 78 | 15 | 0 |
| 25 | 67 | 62 | 1 | 50 | 103 | 10 | 0 |

FIG. 13

TRIALS (RESTRICTED NUMBER OF GENERATIONS : 100)

| | CONVENTIONAL METHOD | | METHOD ACCORDING TO THE PRESENT INVENTION | |
|---|---|---|---|---|
| | MAXIMUM VALUE | GENERATION | MAXIMUM VALUE | GENERATION |
| 1 | 2212 | 87 | 2230 | 49 |
| 2 | 2192 | 40 | 2230 | 20 |
| 3 | 2209 | 75 | 2228 | 89 |
| 4 | 2223 | 84 | 2228 | 22 |
| 5 | 2199 | 93 | 2230 | 34 |
| 6 | 2220 | 35 | 2230 | 15 |
| 7 | 2202 | 62 | 2230 | 52 |
| 8 | 2212 | 61 | 2230 | 28 |
| 9 | 2205 | 57 | 2230 | 21 |
| 10 | 2214 | 99 | 2230 | 71 |

FIG. 14A

TRIALS (RESTRICTED NUMBER OF GENERATIONS : 1,000)

| | CONVENTIONAL METHOD | | METHOD ACCORDING TO THE PRESENT INVENTION | |
|---|---|---|---|---|
| | MAXIMUM VALUE | GENERATION | MAXIMUM VALUE | GENERATION |
| 11 | 2217 | 925 | 2230 | 49 |
| 12 | 2220 | 929 | 2230 | 70 |
| 13 | 2230 | 798 | 2230 | 15 |
| 14 | 2230 | 463 | 2230 | 19 |
| 15 | 2217 | 704 | 2230 | 23 |
| 16 | 2225 | 338 | 2230 | 48 |
| 17 | 2220 | 962 | 2230 | 55 |
| 18 | 2230 | 123 | 2230 | 61 |
| 19 | 2223 | 524 | 2230 | 25 |
| 20 | 2218 | 245 | 2230 | 112 |

FIG. 14B

STATE OF CHARACTER STRINGS
IN 30TH GENERATION
(CONVENTIONAL METHOD)

STATE OF CHARACTER STRINGS
IN 30TH GENERATION
(PRESENT INVENTION)

RESULT( LIMIT GENERATION : 100 )

| TRIAL | MAXIMUM VALUE | GENERATION |
|---|---|---|
| 1 | 2220 | 36 |
| 2 | 2225 | 52 |
| 3 | 2220 | 52 |
| 4 | 2210 | 100 |
| 5 | 2216 | 70 |
| 6 | 2214 | 52 |
| 7 | 2223 | 64 |
| 8 | 2205 | 95 |
| 9 | 2212 | 93 |
| 10 | 2230 | 40 |

RESULT( LIMIT GENERATION : 1000 )

| TRIAL | MAXIMUM VALUE | GENERATION |
|---|---|---|
| 11 | 2230 | 380 |
| 12 | 2228 | 122 |
| 13 | 2230 | 70 |
| 14 | 2230 | 732 |
| 15 | 2230 | 494 |
| 16 | 2230 | 760 |
| 17 | 2230 | 554 |
| 18 | 2230 | 508 |
| 19 | 2223 | 48 |
| 20 | 2230 | 152 |

FIG. 20

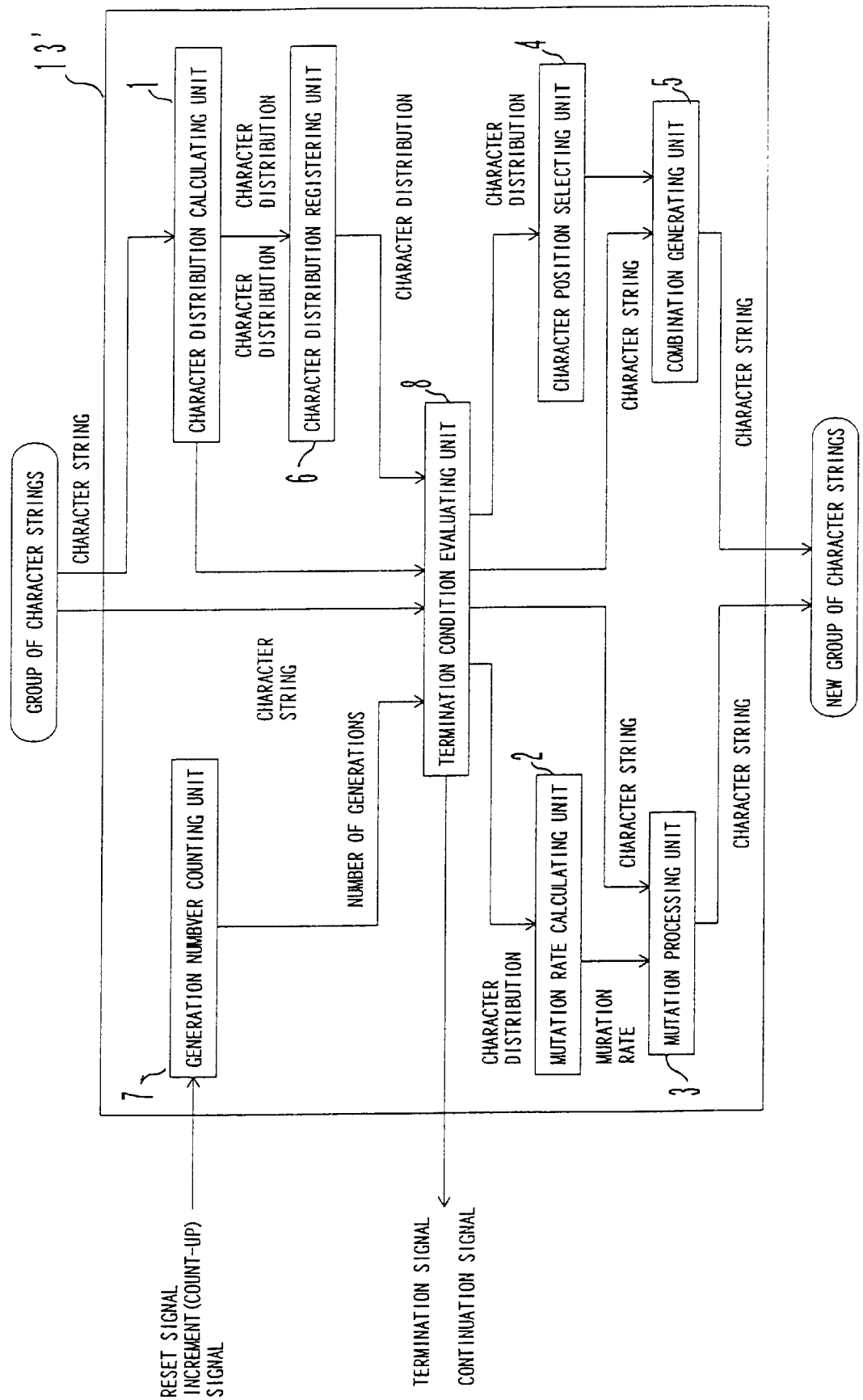
F I G. 21

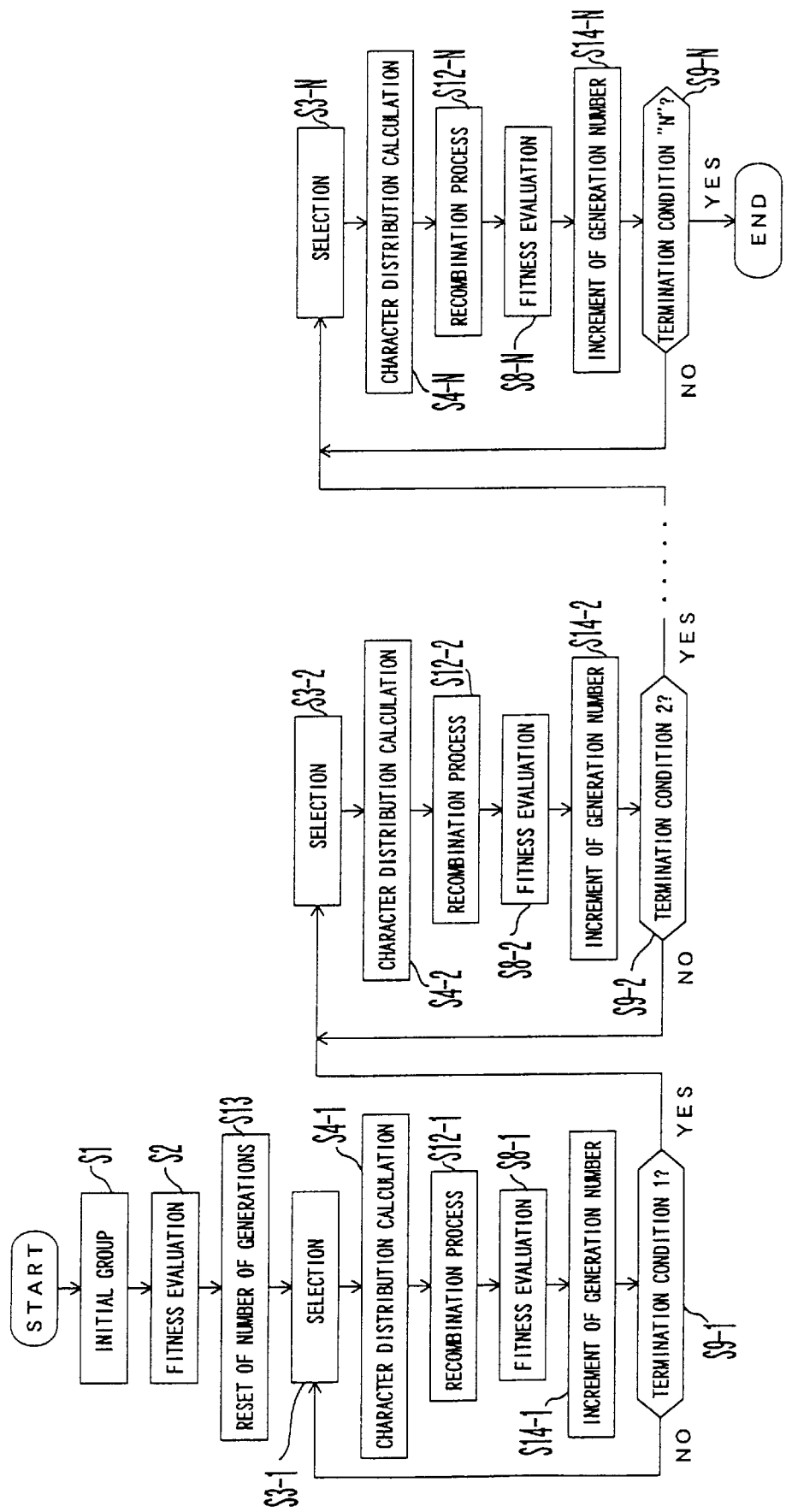
F I G. 22

| TRIAL | MAXIMUM VALUE | GENERATION NUMBER | TERMINATION GENERATION |
|---|---|---|---|
| 1 | 2230 | 49 | 54 |
| 2 | 2230 | 42 | 52 |
| 3 | 2230 | 39 | 47 |
| 4 | 2230 | 137 | 151 |
| 5 | 2230 | 49 | 241 |
| 6 | 2230 | 15 | 17 |
| 7 | 2230 | 10 | 81 |
| 8 | 2230 | 38 | 300 |
| 9 | 2230 | 34 | 334 |
| 10 | 2230 | 36 | 149 |

FIG. 23

DEVICE, METHOD, AND PROGRAM STORAGE MEDIUM FOR EXECUTING GENETIC ALGORITHM

BACKGROUND OF THE INVENTION

1. Field of the Invention

The present invention relates to a genetic algorithm executing device and method for efficiently searching for a solution using a genetic algorithm (GA), and a program storage medium thereof.

2. Description of the Related Art

Genetic algorithms are application technologies inspired by mechanisms of inheritance and evolution of living things. In the evolution of living things, genomic changes like crossovers of chromosomes, mutations of genes, etc. may occur when new individuals (children) are born from old ones (parents). An individual which can not adapt to the environment fails to survive after natural selection on the other hand an adaptable one survives and becomes a parent of a new descendant. Such adaptability is determined by their genomic properties.

In a genetic algorithm, a candidate of solution to an optimization problem is represented as a character string (corresponding to a chromosome which is a one-dimensional string of genes), and a solution is searched by repeating genetic operations including selection, crossover, mutation, etc. In this specification, we use the word "character" not only in the sense of alphabets but also in the universal sense of numbers, symbols, . . . , etc.

Here, evolution of living things corresponds to a process in which a value of the objective function (which is the function evaluated to determine the suitability for the optimization problem) of each character string approaches an optimum value. The selection operation is performed by choosing parent strings with a high evaluation value (which is calculated by the objective function), as shown in FIG. 1A. In a mutation operation, some characters are replaced with other characters at random, as shown in FIG. 1B. In the crossover operation, substrings of a pair of strings are exchanged, as shown in FIG. 1C. By repeating these operations, we can obtain new strings that make the objective function more suitable than with the initial ones.

In the conventional genetic algorithm, mutation is performed uniformly in the whole of string, i.e. over all positions in the string. However in many optimization problems, there are some positions that need not (or have to) be mutated. For such problems, the conventional uniform mutation is not efficient. Accordingly, we can barely obtain a solution by the conventional method, especially for large scale problems.

Furthermore, since a sufficiently large number of generations is required to obtain an adequate string by the conventional genetic algorithm, the search process is continued up to the designated generation, even if a solution has been obtained. The conventional method also has a problem of efficiency of calculation.

SUMMARY OF THE INVENTION

An object of the present invention is to improve the search efficiency of a genetic algorithm by estimating the effect of each position. Another object of the present invention is to save calculation time by automatically terminating the search.

A genetic algorithm executing device according to the present invention is for solving an optimization problem by a genetic algorithm. This device comprises a character-distribution calculating unit for calculating a distribution of characters at each position from a set of strings; a mutation rate calculating unit for calculating a degree of disorder at each position from the distributions of characters, and calculating a mutation rate at each position from the degrees of disorder; and a mutation processing unit for mutation operation according to the mutation rates.

The genetic algorithm executing device according to the present invention may further comprise a character distribution registering unit for registering the distributions of characters. The mutation rate calculating unit may obtain a degree of disorder at each position from the distributions of characters registered in the character distribution registering unit. This device may further comprise a generation number counting unit for counting the number of generations; and a termination condition evaluating unit for evaluating termination condition by using the distributions of characters and/or the number of generations.

Another genetic algorithm executing device according to the present invention comprises a character-distribution calculating unit for calculating a distribution of characters at each position; a character position selecting unit for calculating a degree of disorder at each position from the distributions of characters, and selecting positions with a high degree of disorder; and a combination generating unit for generating new strings by the combinations of characters at the selected positions.

A genetic algorithm executing method according to the present invention is for solving an optimization problem by a genetic algorithm. The method comprises the steps of: calculating a distribution of characters at each position from a set of strings; calculating a degree of disorder at each position from the distributions of characters; calculating a mutation rate at each position from the degrees of disorder; and generating new strings by mutation operation according to the mutation rates.

This method may further comprise the steps of: counting the number of generations; and evaluating termination condition by using the distributions of characters and/or the number of generations. Another genetic algorithm executing method according to the present invention comprises the steps of: calculating a distribution of characters at each position from a set of strings; calculating a degree of disorder at each position from the character distributions; selecting positions with a high degree of disorder; and generating new strings by the combinations of characters at the selected positions. In the step of generating new strings, characters at the selected positions are reset to the best combination.

A computer-readable storage medium according to the present invention stores a computer program for implementing a genetic algorithm executing method for solving an optimization problem by a genetic algorithm. The genetic algorithm executing method implemented by the computer program may comprise the steps of the above described genetic algorithm executing method according to the present invention. If the storage medium is an external storage medium, it is realized by an optical storage medium such as a CDROM, etc., a magnetic storage medium such as a floppy disk, etc., and a magneto-optical storage medium such as an MD, etc. If the storage medium is an internal storage medium, it is realized by a hard disk, a ROM, a RAM, etc.

BRIEF DESCRIPTION OF THE DRAWINGS

FIGS. 5A, 5B, 5C and 6 are diagrams explaining a degree of disorder;

FIG. 9 is a flowchart showing the second example of the genetic algorithm executing process according to the present invention;

FIG. 13 exemplifies the knapsack problem;

FIGS. 14A and 14B are tables showing comparison between performance of the conventional method and the present invention;

Figure 15:
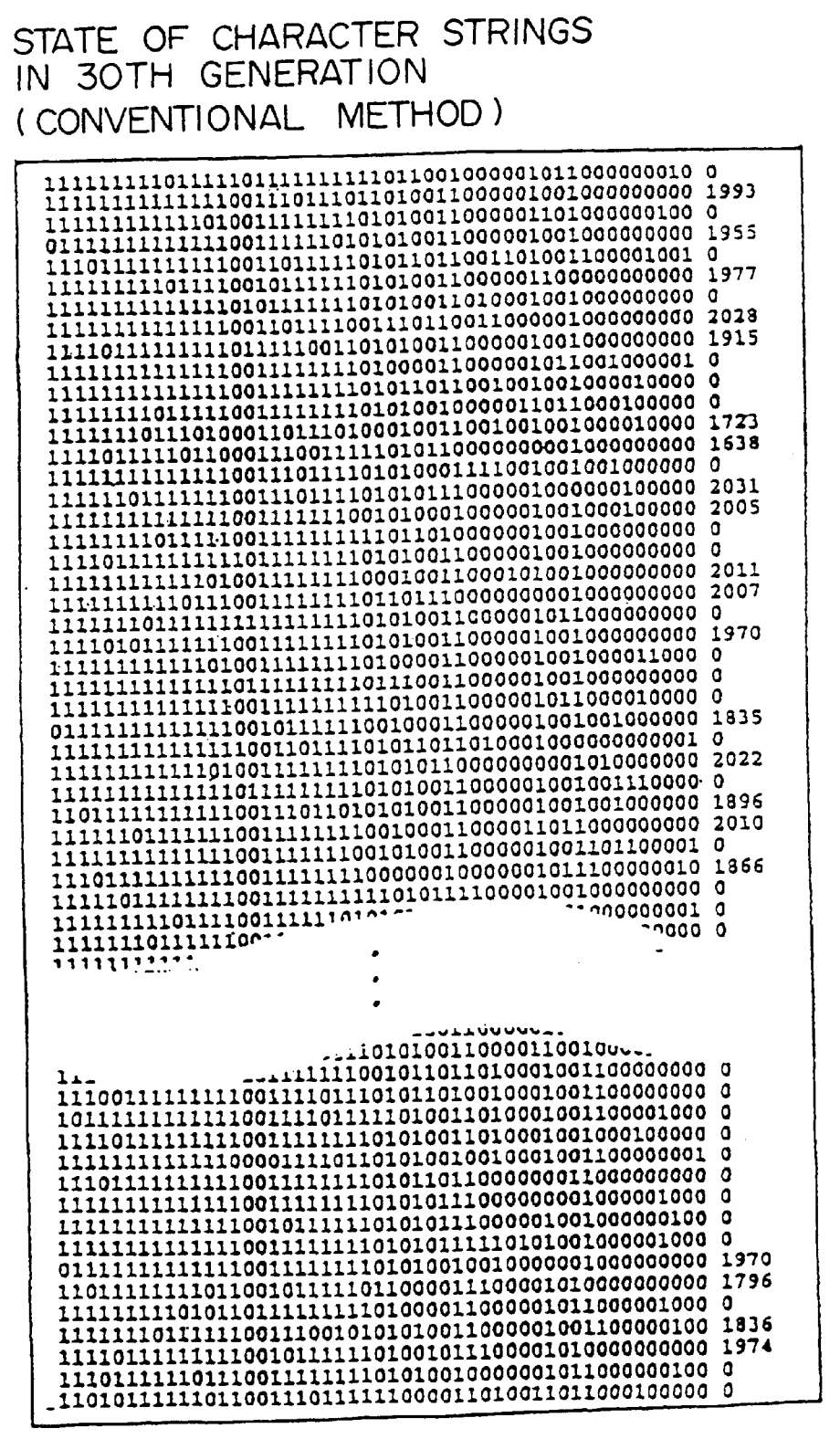

FIG. 15 shows character strings in an intermediate generation according to the conventional method;

FIG. 16 shows character strings in an intermediate generation according to the present invention;

FIG. 20 are tables showing the results of the process obtained in the third example;

FIG. 21 is a block diagram showing the configuration of the genetic algorithm executing device according to the second embodiment of the present invention;

FIG. 22 is a flowchart showing the genetic algorithm executing process according to the second embodiment;

FIG. 23 is a table showing the result of the genetic algorithm executing device according to the second embodiment.

DESCRIPTION OF THE PREFERRED EMBODIMENT

Figure 1A:
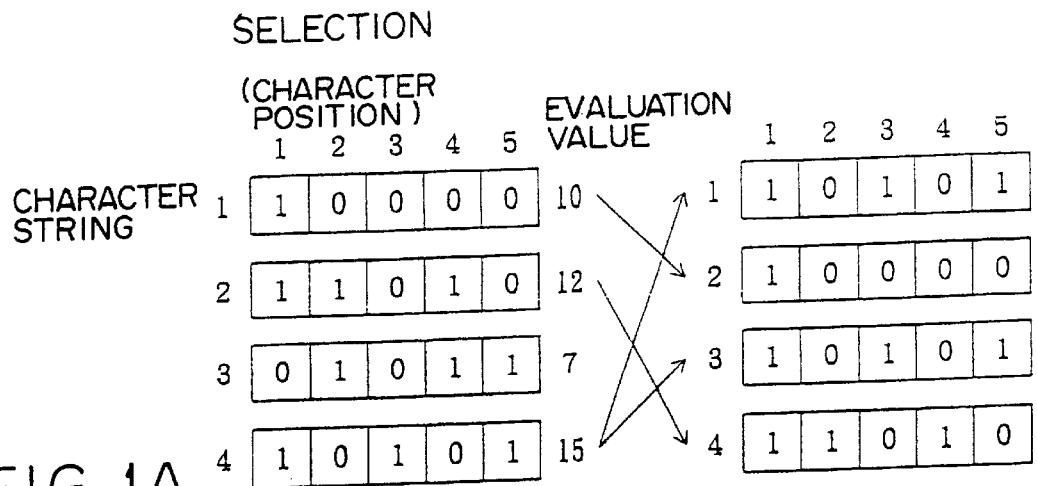
FIGS. 1A, 1B, and 1C are schematic diagrams explaining a genetic algorithm.
Figure 1B:
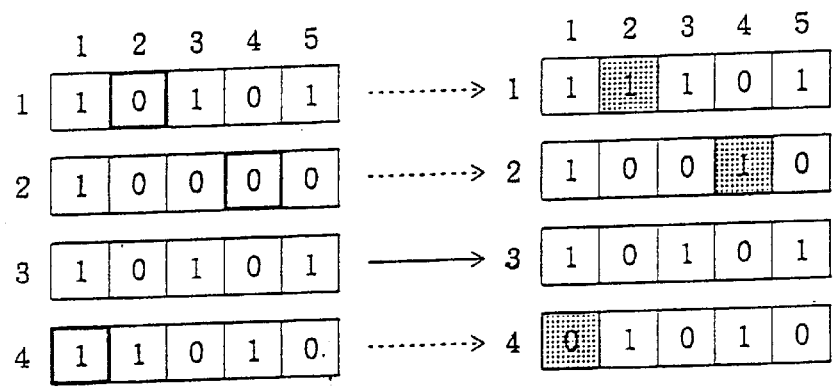
Figure 1C:
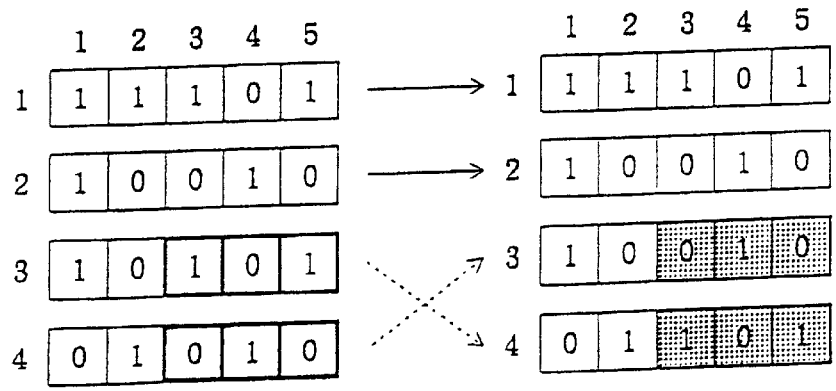
Figure 2A:
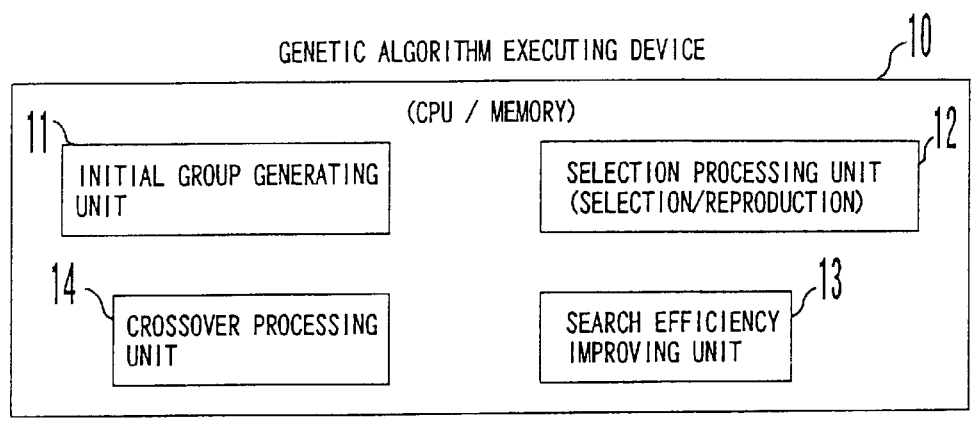
FIGS. 2A and 2B are block diagrams showing the basic configuration of a genetic algorithm executing device according to the present invention.
Figure 2B:
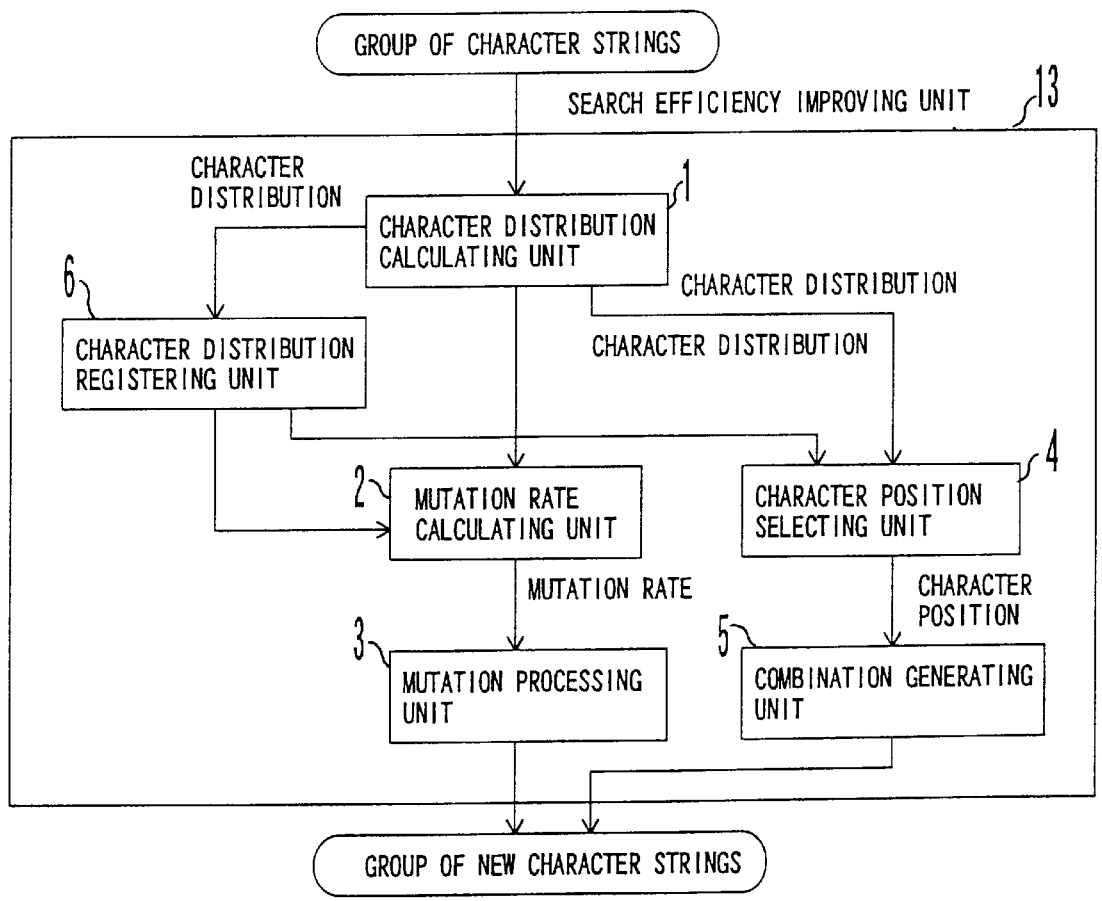

FIG. 2A and 2B are block diagrams showing the configuration of a genetic algorithm executing device according to the present invention. As shown in FIG. 2A, a genetic algorithm executing device 10 is composed of a CPU, a memory, etc. This device comprises an initial string generating unit 11 for generating (or selecting) initial strings; a selection processing unit 12 for selecting strings with a high evaluation value; a search efficiency improving unit 13 for promoting search efficiency by operations such as mutation, etc.; and a crossover processing unit 14 for performing a crossover operation on string pairs selected from a set of strings.

As shown in FIG. 2B, the unit 13 of the device 10 includes a character-distribution calculating unit 1, a mutation rate calculating unit 2, a mutation processing unit 3, a character-position selecting unit 4, a combination generating unit 5, and a character-distribution registering unit 6. The search efficiency improving unit 13 may be configured by the character-distribution calculating unit 1, the mutation rate calculating unit 2, and the mutation processing unit 3, or by the character-distribution registering unit 6 in addition to the above described three units. Furthermore, the search efficiency improving unit 13 may be configured by the character-distribution calculating unit 1, the character-position selecting unit 4, and the combination generating unit 5, or by the character-distribution registering unit 6 in addition to the above described three units.

Figure 4A:
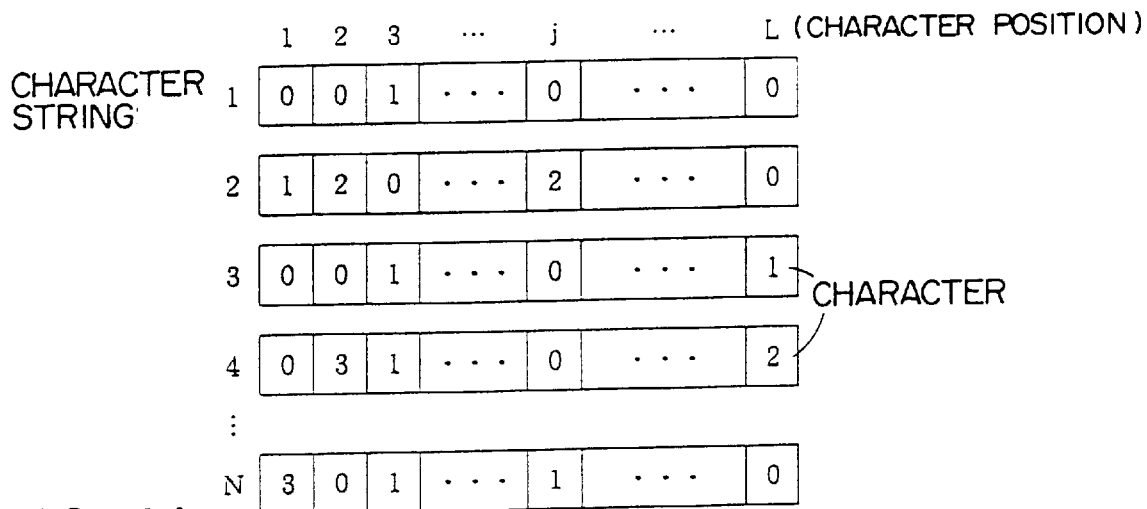
FIGS. 4A and 4B are diagrams explaining the concept of a distribution of characters.
Figure 4B:
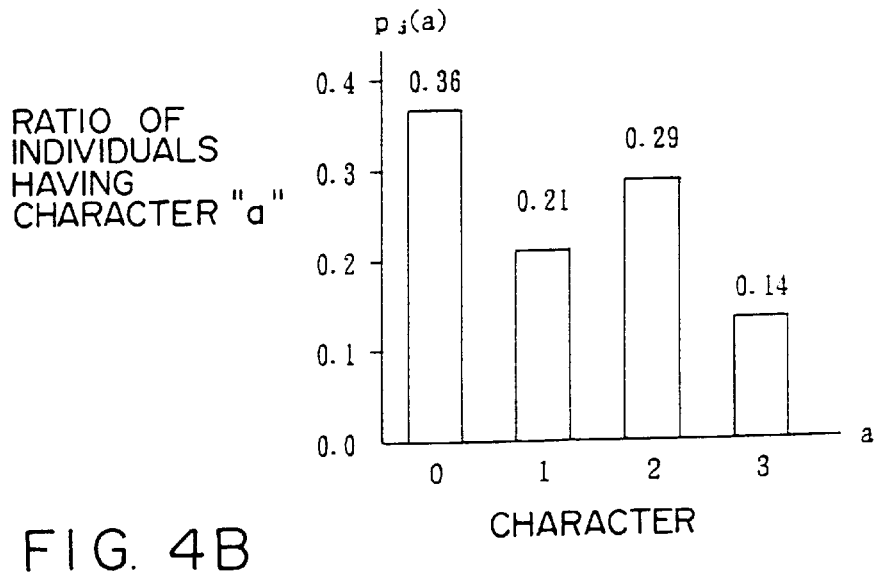

The unit 1 receives strings selected by the selection operation, and calculates distributions of characters for all positions. The character-distribution at J-th position (j=1, 2, ..., L) is composed of pj(a), which is the ratio of the number of strings with 'a' at the j-th position to the total number of a set of strings. In this specification, a set of pj(a) for all available a's is abbreviated to <pj(a)>. FIG. 4A shows N strings which have L positions. For example, when N=100 and there are 36, 21, 29 and 14 strings with 0, 1, 2 and 3 at j-th position respectively, the character-distribution is pj(0)=0.36, pj(1)=0.21, pj(2)=0.29, and pj(3)=0.14 as shown in FIG. 4B.

The distributions of characters are calculated in order to estimate effect of each character-position. A position in which a certain character is frequently distributed is thought to be "fatal". Thus on such a position the mutation rate should be reduced. Conversely, a character position in which no character is frequently distributed is thought to be "changable". Thus on such position a mutation should be promoted.

The unit 2 obtains the degree of disorder rj, which is calculated according to the function Rj(<pj(a)>), and calculates the mutation rate mj according to the obtained r1, r2, ..., rL. The function Rj is nonnegative and has a maximum value when all the pj(a)'s are the same value. FIG. 5A, 5B, 5C and 6 are diagrams for explaining the degree of disorder. In this example, the string has 4 characters, and the available characters are 0 and 1 for all positions. FIG. 5A, 5B and 5C exemplifies the degree of disorder function Rj(pj(0), pj(1)). The mutation rate mj is reset to be smaller if rj decreases, and conversely it is reset to be larger if rj increases. The search efficiency is improved by reducing the mutation rate on the "fatal" positions and promoting mutation on the "changable" positions.

The value of mj is calculated by the function Mj(r1, r2, ..., rL) as follows $$mj = Mj(R1(<p1(a)>), R2(<p2(a)>), \ldots, RL(<pL(a)>))$$

The value of MJ is a real number between 0 and 1. Additionally, Mj is a nondecreasing function of r1, r2, ..., rL. Namely, if ak<bk, Mj satisfies the following inequality for k=1, 2, ..., L $$Mj(r1, \ldots, rk\text{-}1, ak, rk\text{+}1, \ldots, rL) \leq Mj(r1, \ldots, rk\text{-}1, bk, rk\text{+}1, \ldots, rL).$$

The unit 3 performs the mutation operation according to m1, m2, ..., mL obtained by the unit 2. For example, the function Mj can be defined with the following form $$Mj(r1, \ldots, rL) = \epsilon i\, A i,j f i(r i)$$

where Ai,j is a constant matrix and fj is a function of rj. (Here εi indicates summation for I). Specifically, assuming that the constant matrix Ai,j satisfies Ai,j=1 if i=j, and Ai,j=0 if i≠j, the above equation is simplified as follows $$Mj(r1, \ldots, rL) = fj(rj)$$

This definition is thought to be practical because they can be rapidly calculated by parallel computing.

The following method is also effective. The unit 4 calculates rj from <pj(a)> obtained by the unit 1, and selects the positions with a high value of rj. The unit 5 generates combinations of all available characters in the selected positions by the unit 4. At the position which is not selected, the character is fixed by the original or the most frequently distributed one. Furthermore the unit 5 selects a string with the highest evaluation value among the generated strings. The processes by the unit 4 and 5 is desirable to execute after some generations. Additionally, these processes may be performed together with the mutation process by the unit 2 and 3. In this case, the unit 2 and 3 may be used for some strings, while the other strings are processed by the unit 4 and 5. The unit 6 is a means for registering the distributions of characters obtained by the unit 1. For example, we can save calculation time by using the character-distributions registered in the unit 6 several times.

Figure 3:
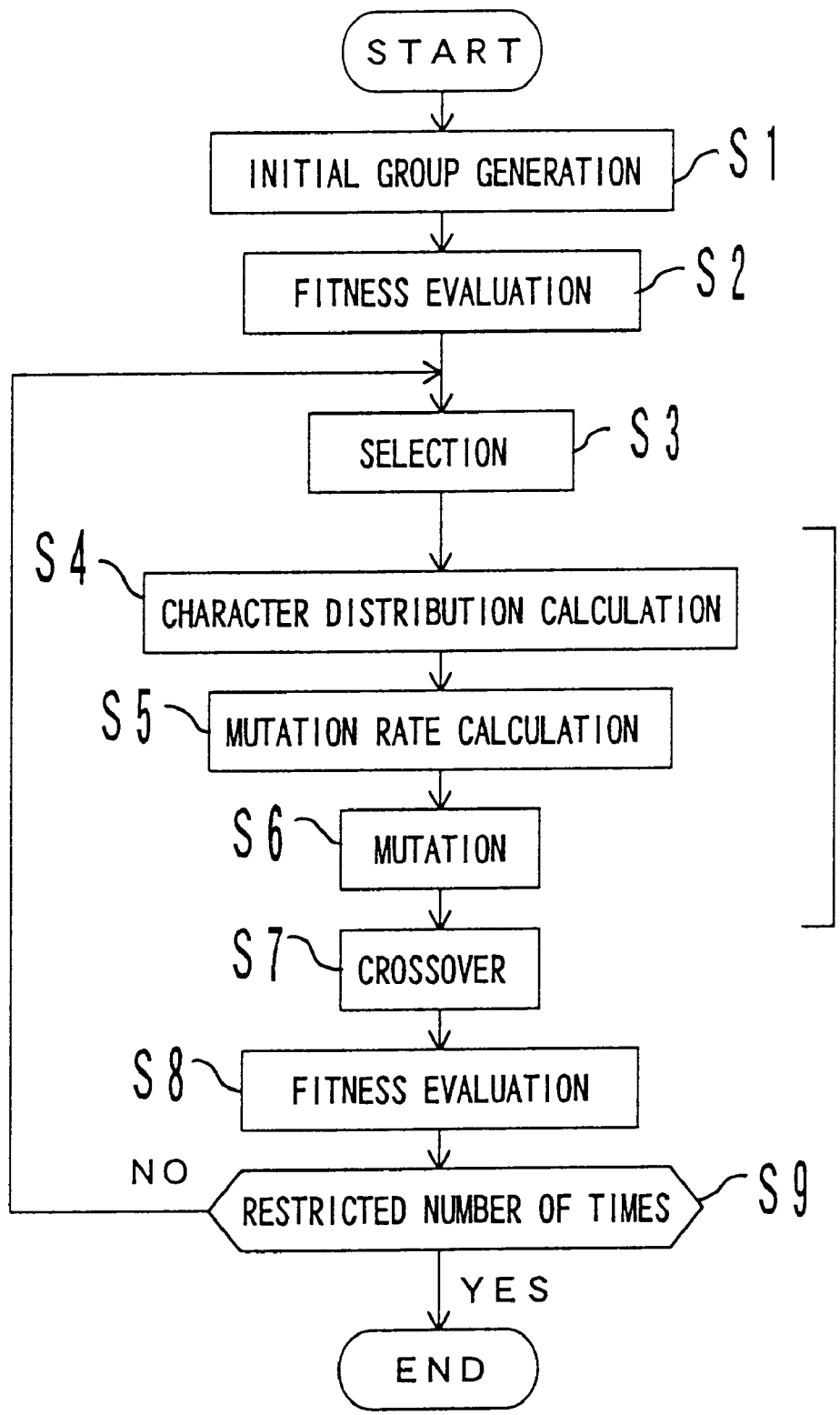
FIG. 3 is a flowchart showing the first example of a genetic algorithm executing process according to the present invention.

FIG. 3 shows a flowchart of the first example according to the present invention. In FIG. 3, steps S4 to S6 are operations performed by the unit 13 shown in FIG. 2B. In step S1, initial strings are created at random. In step S2, evaluation values of strings are calculated. In step S3, strings with a high evaluation value are selected (for example, by the roulette selection method). By this operation, unsuitable strings are rejected. In step S4, the distributions of characters are calculated by the unit 1 shown in FIG. 2B. In step S5, the unit 2 calculates rj by using the function Rj(<pj(a)>), and resets mj by using the function Mj(r1, r2, ..., rL). In step S6, the unit 3 performs mutation operation according to mj calculated by the unit 2. Then, crossover operation in step S7, and evaluation in step S8 are performed on strings generated by the previous step. In step S9, it is determined whether the process is continued or not. The operations of steps S3 to S8 are repeated until limit generation.

Figure 7:
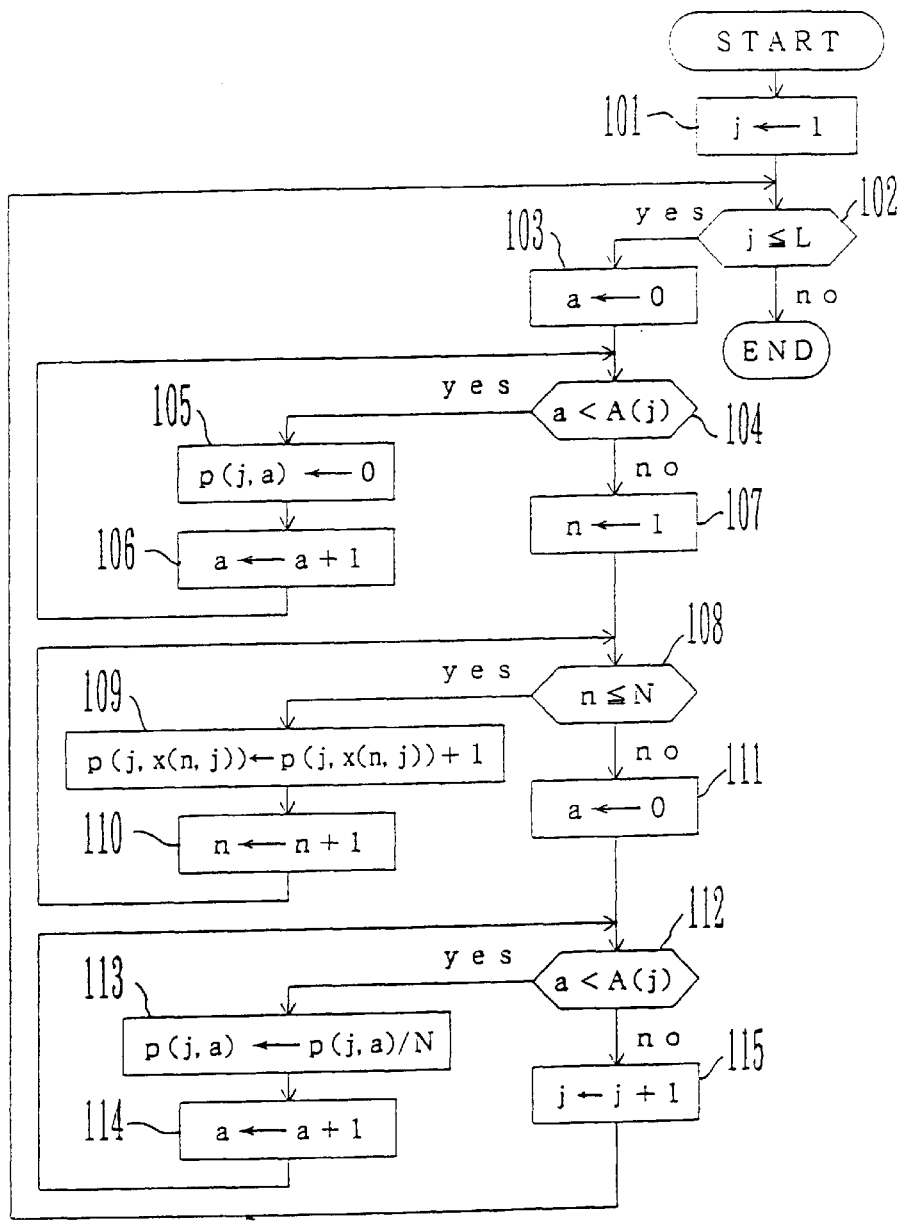
FIG. 7 is a flowchart showing the process performed by a character-distribution calculating unit.

FIG. 7 shows a flowchart of the process performed by the unit 1. In this figure, L indicates the number of positions, N indicates the total number of character strings, A(j) indicates the number of available characters at j-th position, x(n, j) indicates the character at j-th position in the n-th string, and p(j, a) indicates the ratio of the number of strings with a at j-th position to the total number of strings. The unit 1 repeats the following process for j=1, 2, ..., N (steps 101 and 102). First of all, all the values of p(j, a) are initialized to be zero (steps 103 to 107). Then, the process for counting the number of characters a at j-th position in the n-th string is performed (step 108 to 111). Next, the process for calculating p(j, a) is performed (steps 112 to 115).

Figure 8:
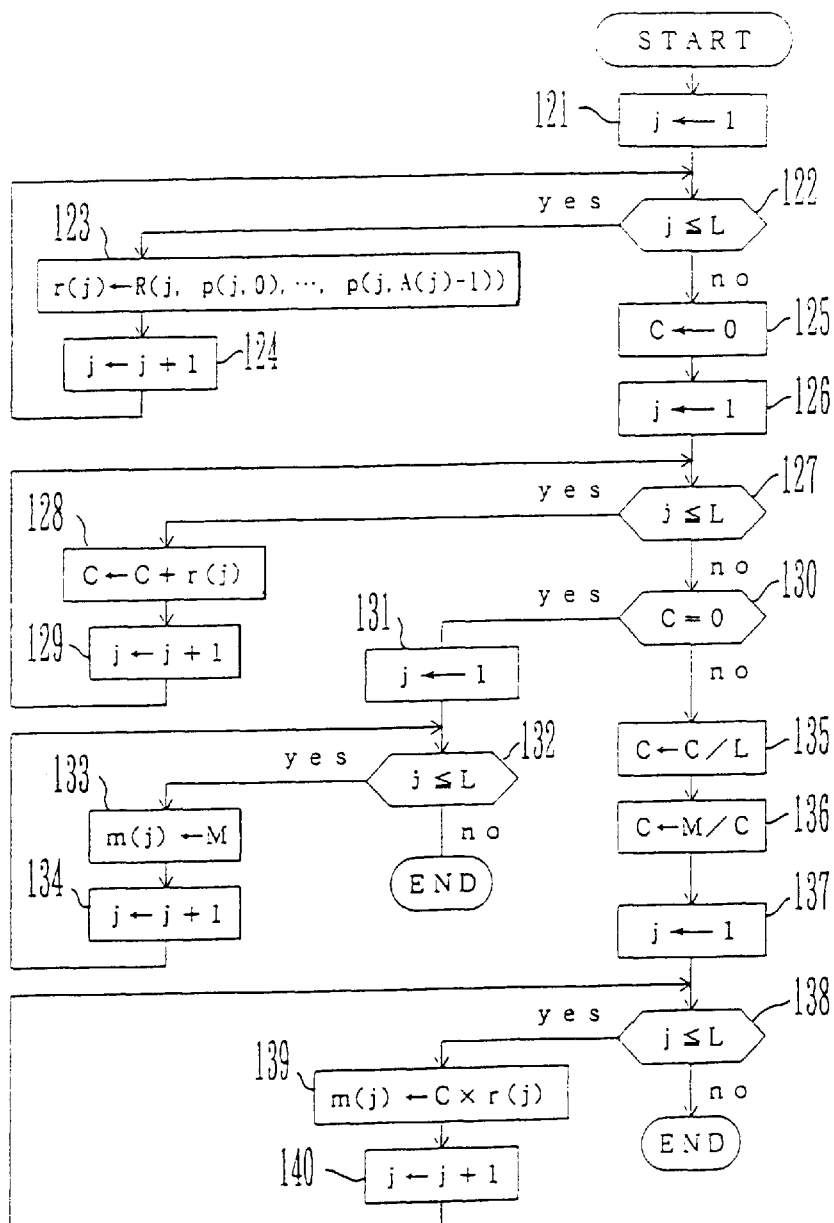
FIG. 8 is a flowchart showing the process performed by a mutation rate calculating unit.

FIG. 8 shows a flow chart diagram of the process performed by the unit 2 according to the following function $$Mj(r1, r2, \ldots, rL) = M \times [L\, \epsilon rj/\{\epsilon k\, rk\}]j=1, 2, \ldots, L$$

where M is a constant. In FIG. 8, L indicates the number of positions, r(j) indicates the degree of disorder at j-th position, A(j) indicates the number of available characters at j-th position, p(j, a) indicates the ratio of the number of strings with a at j-th position to the total number of character strings, R(j, ...) indicates the function to calculate the degree of disorder at j-th position, M indicates a constant, and m(j) indicates the mutation rate at j-th position. The unit 2 performs the process for calculating r(j) by using R(j, ...) (steps 121 to 124). Then, the process for calculating the summation part included in the right hand of the above equation is performed (steps 127 to 129). Here, if the summation C of r(j)'s vanishes, all mutation rates are set to the constant M (steps 130 to 134). If the total C is not zero, m(j) is calculated by using the above equation (steps 135 to 140).

To test the performance of the genetic algorithm, a knapsack problem is cited in this specification. The objective of this problem is to maximize the total price of items put into a knapsack subject to limit of the total capacity. Each of items corresponds to a bit, in which 0 means "not selected" and 1 means "selected". The objective function is defined as total price of the selected items, where it vanishes when total capacity of the selected items exceeds capacity of a knapsack. FIG. 13 exemplifies the knapsack problem used in this embodiment. The number of items is 50, and the items are numbered from 1 to 50 according to the descending order of price per capacity. If capacity of a knapsack is 1,500, the optimum value is 2,230. This solution is indicated in the "solution" column of FIG. 13. In the knapsack problem, it is usually more effective to select items with a higher value of price per capacity. Namely, in FIG. 13, the small numbered items should be selected, while the large numbered ones should be rejected. The solution bits in FIG. 13 support this assertion, because the bits of the items 1 to 25 are 1, and the most bits of the items 26 to 50 are 0. In other words, the bits of small and large numbered items in this problem are "fatal".

To apply the first example to the above problem, the function Rj is defined as follows $$Rj(pj(0), pj(1)) = 20 - 19 \times |pj(0) - 0.5| - 19 \times |pj(1) = 0.5|j=1, \ldots, 50$$

where |*| represents an absolute value. This function has the maximum value 20 when pj(0)=pj(1) =0.5, and the minimum value 1 when pj(0)=1 and pj(1)=0, or pj(0)=0 and pj(1)=1. mj is reset as follows $$mj = 0.08 \times [50 \times Rj(pj(0), pj(1)) / \{\epsilon k\, Rk(pk(0), pk(1))\}]j=1, \ldots, 50.$$

FIG. 14A and 14B show the comparison between performance of the conventional method and the present invention. In this performance test, the average mutation rate, the number of strings, and the crossover probability are assumed to be 0.08, 100, and 0.5 respectively. FIG. 14A shows the results until 100 generations. Then the optimum value 2,230 was never obtained by the conventional method. On the other hand, by the present invention, 2,230 was obtained 8 times. Furthermore, 2,228, which is very close to the optimum value was obtained in the rest trials. FIG. 14B shows the results until the 1,000th generation. In this case, 2,230 was obtained 3 times by the conventional method. On the other hand, by the present invention, 2,230 was obtained every time. Additionally, the generations required for 2,230 was 47.4 on average. This is a quite good result in comparison with the average 461.3 of 3 successful cases by the conventional method. These results prove that the present invention is more effective than the conventional method.

To understand the reason of the previous results, we consider the search processes of both methods in detail. FIG.

Figure 16:
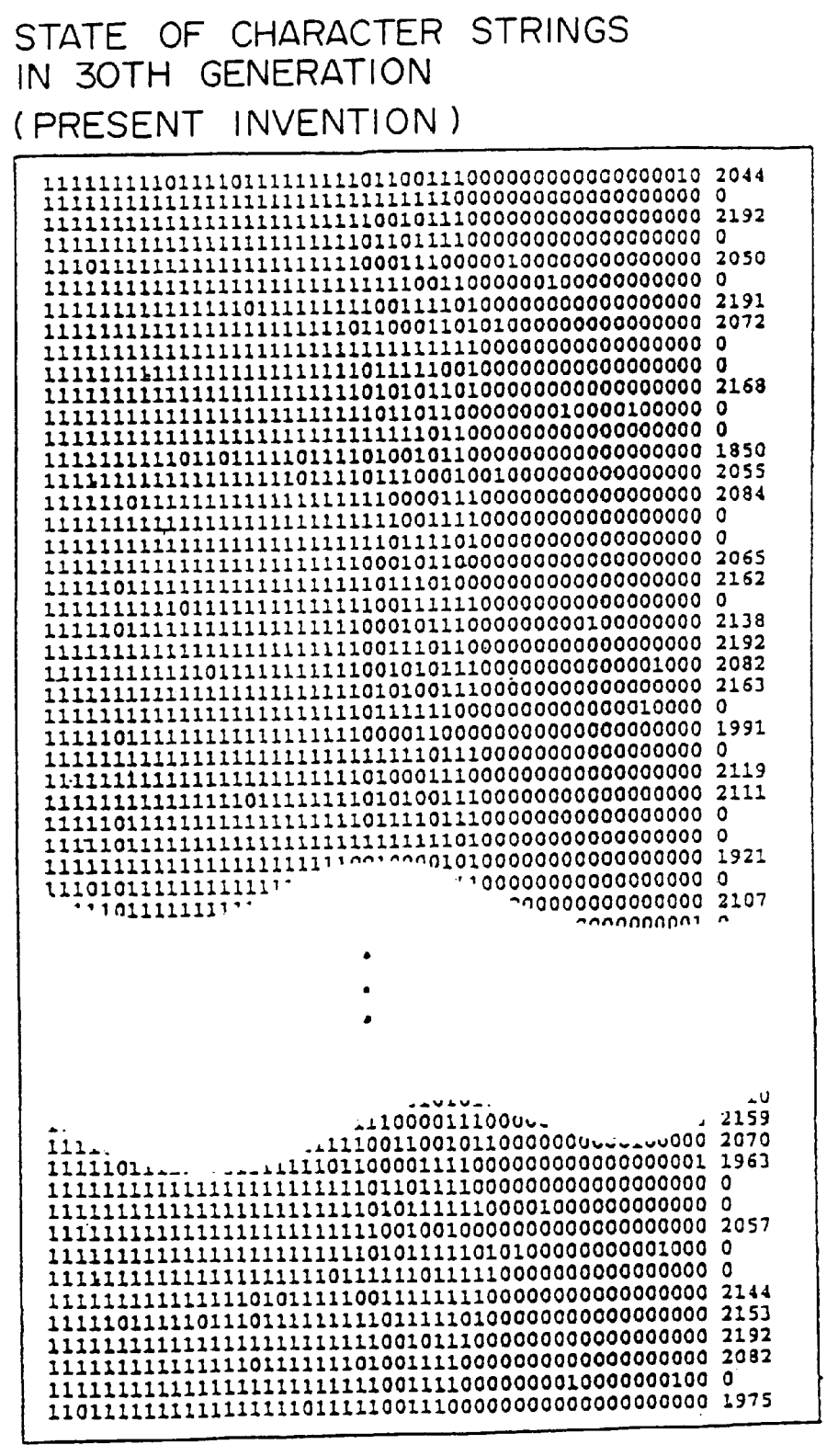

15 and 16 shows the strings in the 30th generation by the conventional method and the present invention. The characters are sequentially displayed from the left side according to the item numbers 1 to 50 (refer to FIG. 13), and the right side digits represent the evaluation value. In the conventional method, 59 strings was invalid, this number was quite larger than 38 of the present invention. The reason why there are few invalid strings in FIG. 16 is that the mutation rates at the "fatal" bits are reduced.

Figure 17:
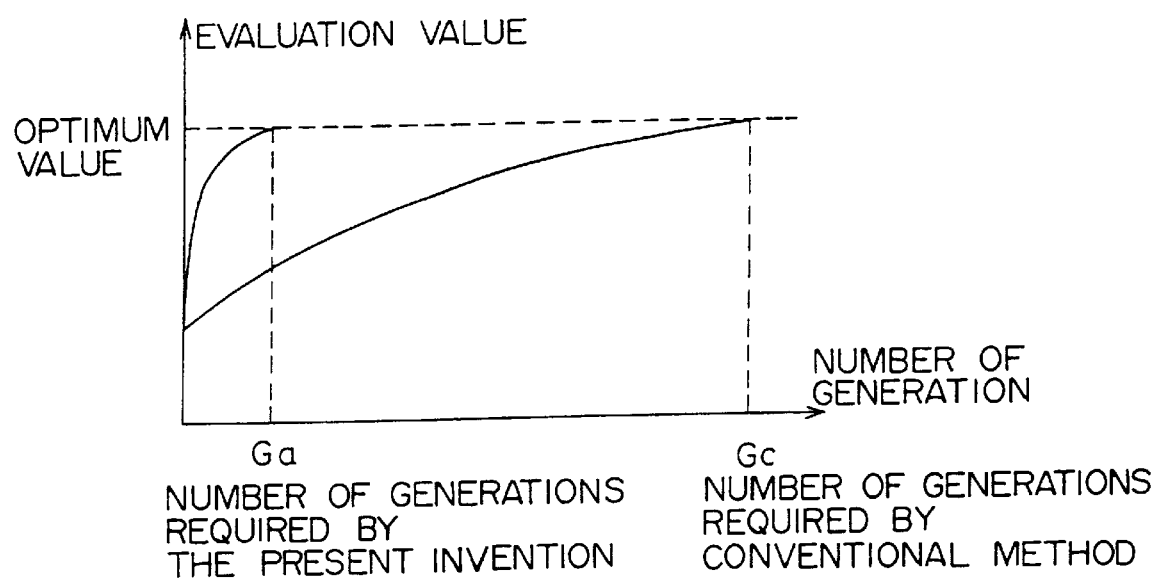
FIG. 17 shows a schematic diagram of the maximum evaluation value obtained until the number of generations.
Figure 18:
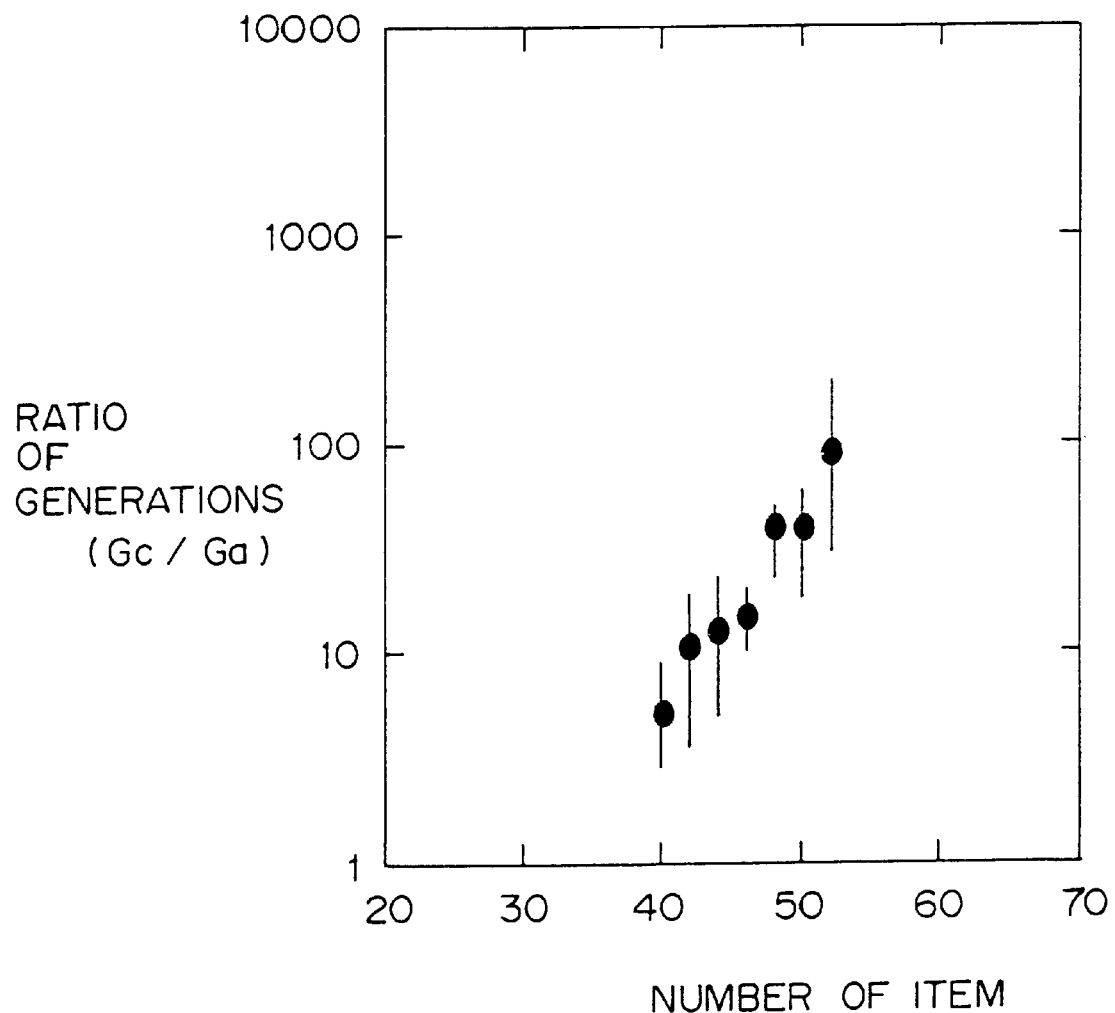
FIG. 18 shows performance of the present invention in comparison with the conventional method.

FIG. 17 shows a schematic diagram of the maximum evaluation value obtained until the number of generations. Gc and Ga are generations required for optimization by the conventional method and the present invention respectively. The ratio Gc/Ga shows the performance of the present invention in comparison with the conventional method. FIG. 18 shows the ranges (indicated by segments) of the ratio Gc/Ga and their average values (indicated by black dots) for 5 different problems solved by the conventional method and the present invention. The tests were performed on problems with 40, 42, 44, 46, 48, 50 and 52 items. Gc/Ga grows according to the number of items. This result shows the efficiency of the present invention especially in the large scale problem.

Figure 10:
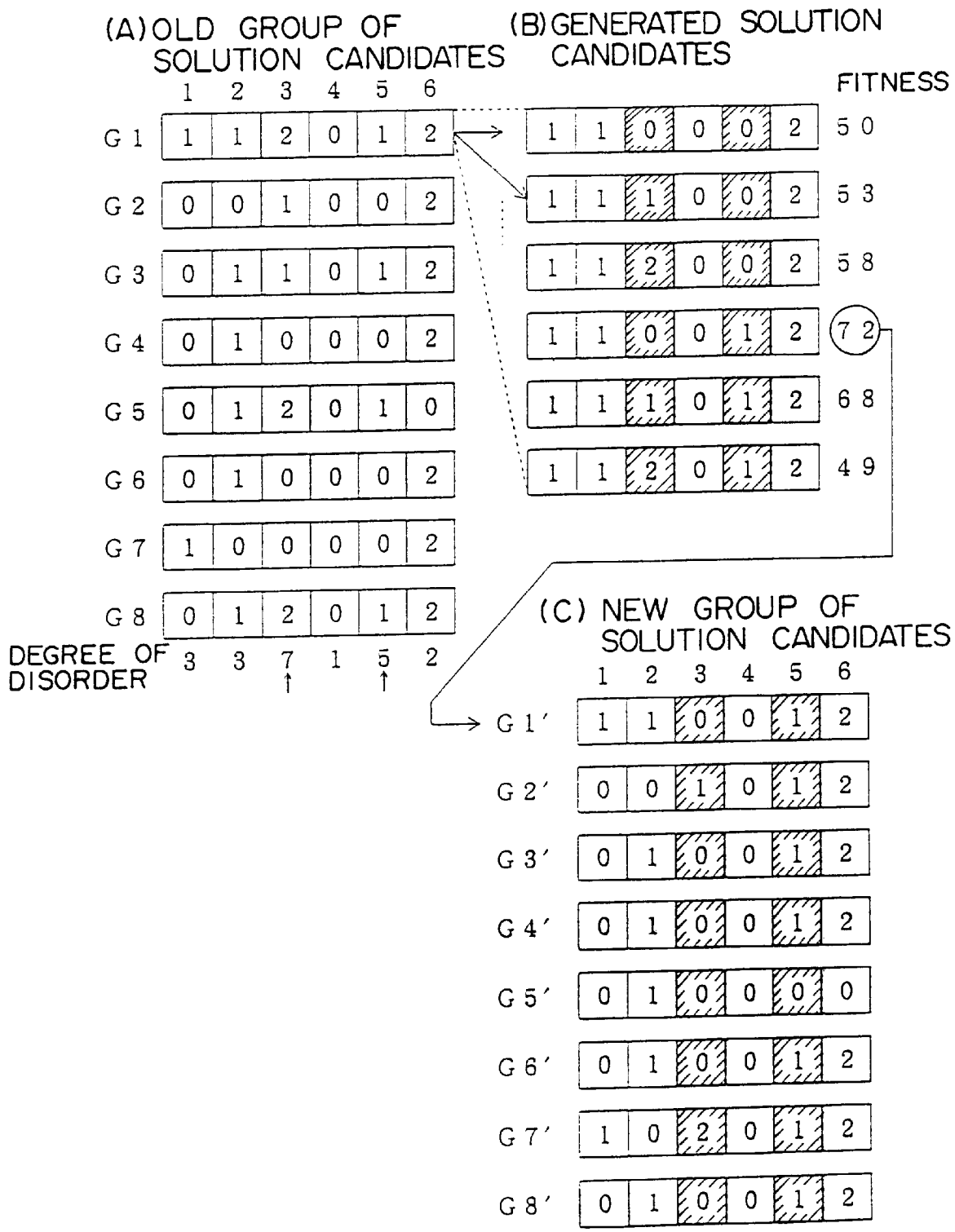
FIG. 10 is a diagram explaining a process of a character position selection and combination generation.

FIG. 9 is a flowchart showing the second example of the genetic algorithm executing device according to the present invention. In this example, steps S10 and S11 are performed instead of steps S5 and S6 in the first example, therefore explanations for steps except S10 and S11 are omitted here. In step S10, the unit 4 obtains rj, and selects j's for which rj is higher than a threshold value. FIG. 10 shows diagrams to explain steps S10 and S11. (A) of FIG. 10 exemplifies strings after step S3. As shown in this figure, the available characters at the third and sixth positions are 0, 1, and 2, while those at the other positions are 0 and 1. In step S10, rj is obtained and positions in which rj is greater than 4 (a threshold value) are selected. In step S11, the unit 5 generates strings of all available characters at the selected positions (refer to (B) in FIG. 10), and the string with the maximum value is selected (refer to (C) in FIG. 10).

Provided below is the specific explanation about the process performed on the first string (G1) shown in (A) of FIG. 10. First of all, all of the combinations of the characters at the third and fifth positions, in which the degree of disorder is higher than the threshold value 4, are generated. The available characters at the third position are 0, 1, and 2, while those at the fifth position is 0 and 1. Accordingly, the six strings of combinations 00, 10, 20, 01, 11, and 21 are generated as shown in (B) of FIG. 10, and a string with the maximum value (=72) is defined as G1'. The same processes are performed also on G2 to G8. Consequently new strings G1' to G8' are generated as shown in (C) of FIG. 10.

Figure 11:
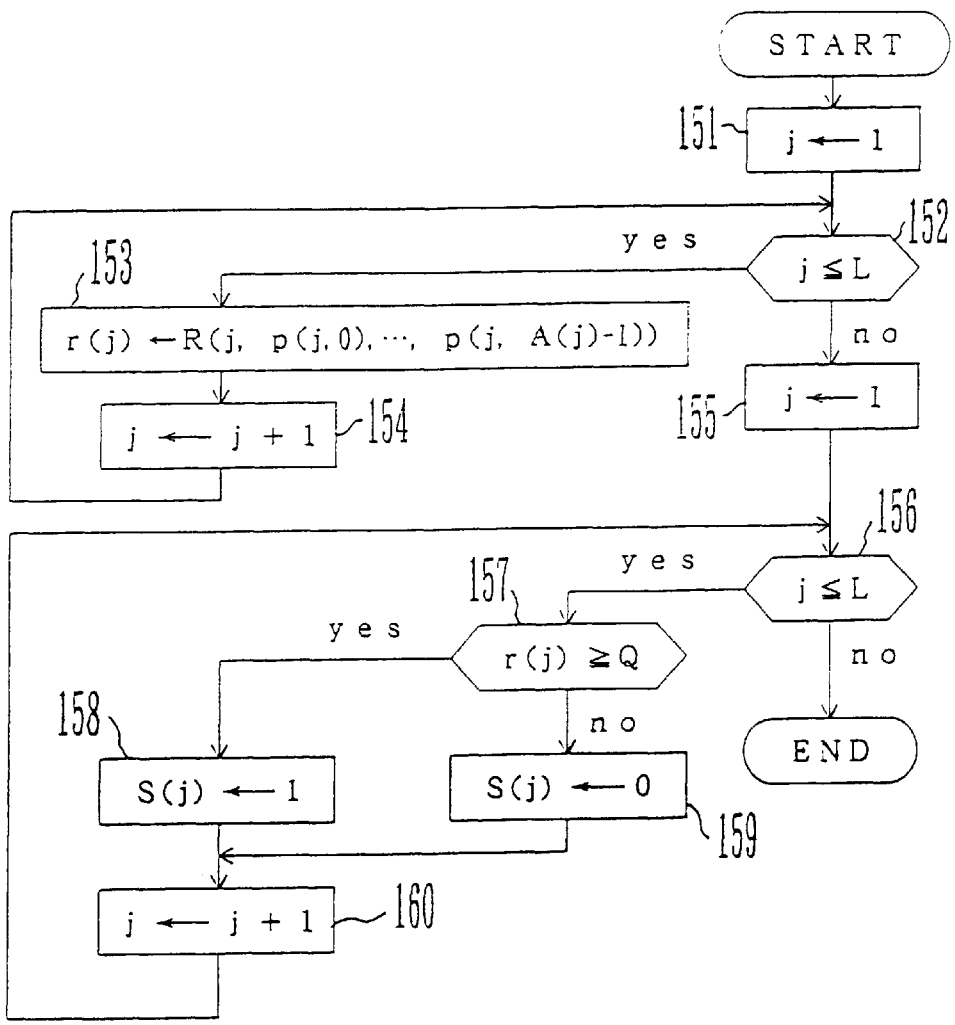
FIG. 11 is a flowchart showing the process performed by a character position selecting unit.

FIG. 11 is a flowchart showing the process performed by the unit 4. In this figure, L indicates the number of positions, R(j, ...) indicates the function to calculate the degree of disorder at j-th position, r(j) indicates the degree of disorder at j-th position, A(j) indicates the number of available characters at j-th position, p(j, a) indicates the ratio of the number of strings with a at j-th position to the total number of strings, Q indicates a threshold value, and S(j) indicates an identification value representing selected/rejected at j-th position. The unit 4 calculates r(j) by using the function R(j, ...) (steps 151 to 154). Next, it is tested whether or not r(j) is less than a threshold value Q. S(j) is set to 0 if r(j)<Q, and is set to 1 if r(j)>=Q (steps 155 to 160).

Figure 12:
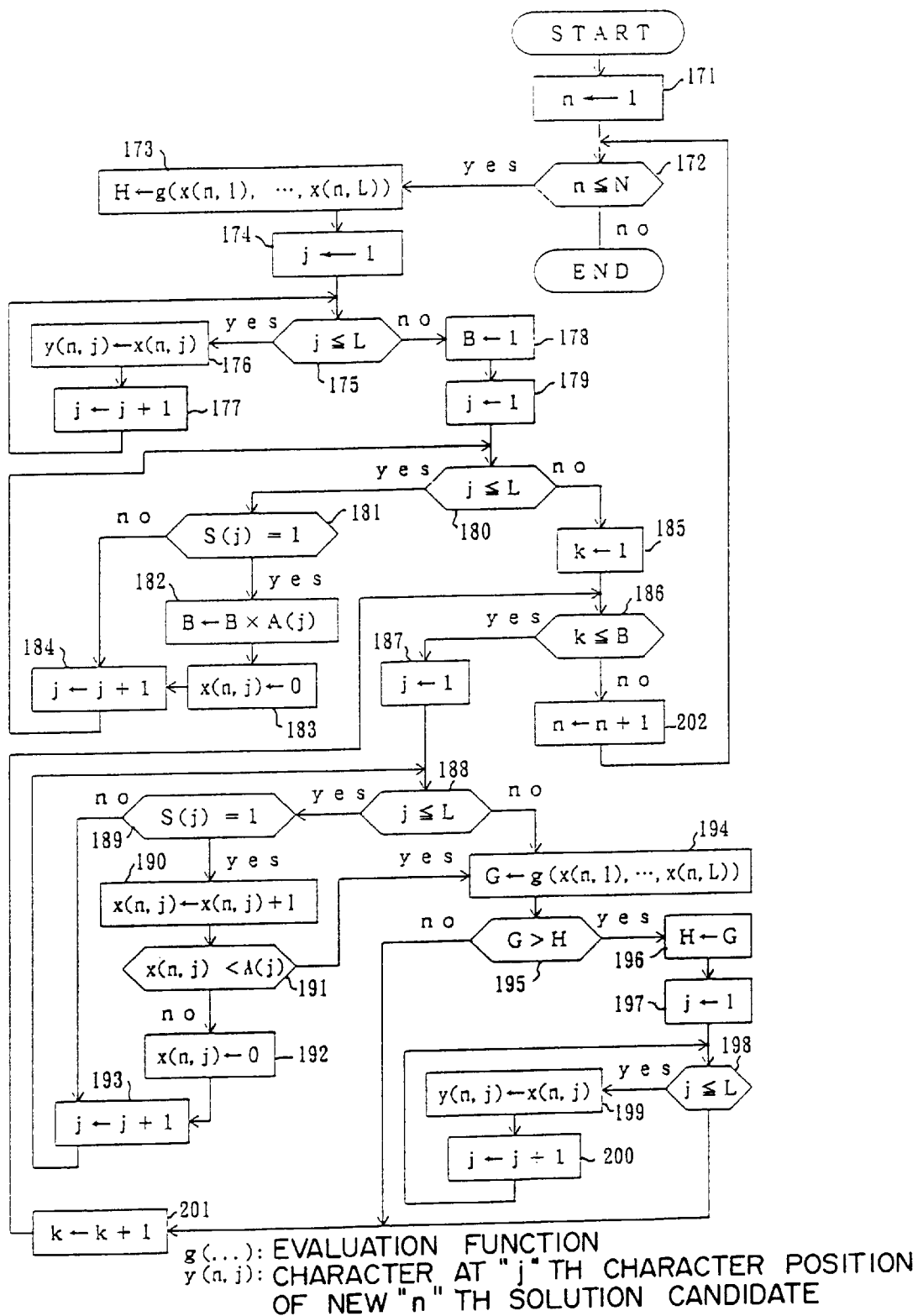
FIG. 12 is a flowchart showing the process performed by a combination generating unit.

FIG. 12 is a flowchart showing the process performed by the unit 5. In this figure, L indicates the number of positions, N indicates the total number of strings, A(j) indicates the number of available characters at J-th position, x(n, j) indicates the character at J-th position of the n-th string, S(j) indicates a selected/rejected identification value at j-th position, g( ... ) indicates an evaluation function, and y(n, j) indicates the character at j-th position in the new n-th string. The unit 5 repeats the following processes while incrementing the string number n by 1 (step S202) from the first to N-th string (steps 171 and 172). First of all, the result of g( ... ) of the n-th string is assigned to a variable H (step S173). Next, the string x(n, 1), ..., x(n, L) is copied to y(n, 1), ..., y(n, L) (steps 174 to 177). Next, the total number of combinations B is calculated from A(j) and S(j) (steps 178 to 184). Then, the combinations of all available characters at the selected positions are generated one by one (steps 185 to 193, which correspond to the process shown in (B) of FIG. 10). At this time, the result of g( ... ) of the string x(n, 1), x(n, 2), ..., x(n, L) is set to a variable G (step 194), and H, y(n, 1), y(n, 2), ..., y(n, L) is substituted by G, x(n, 1), x(n, 2), ..., x(n, L) If G>H (steps 196 to 200). In this way, the old string is replaced by the new string with the highest value among strings generated by B combinations (steps 185 to 201). This process is performed on all of the old strings (step 202).

Figure 19:
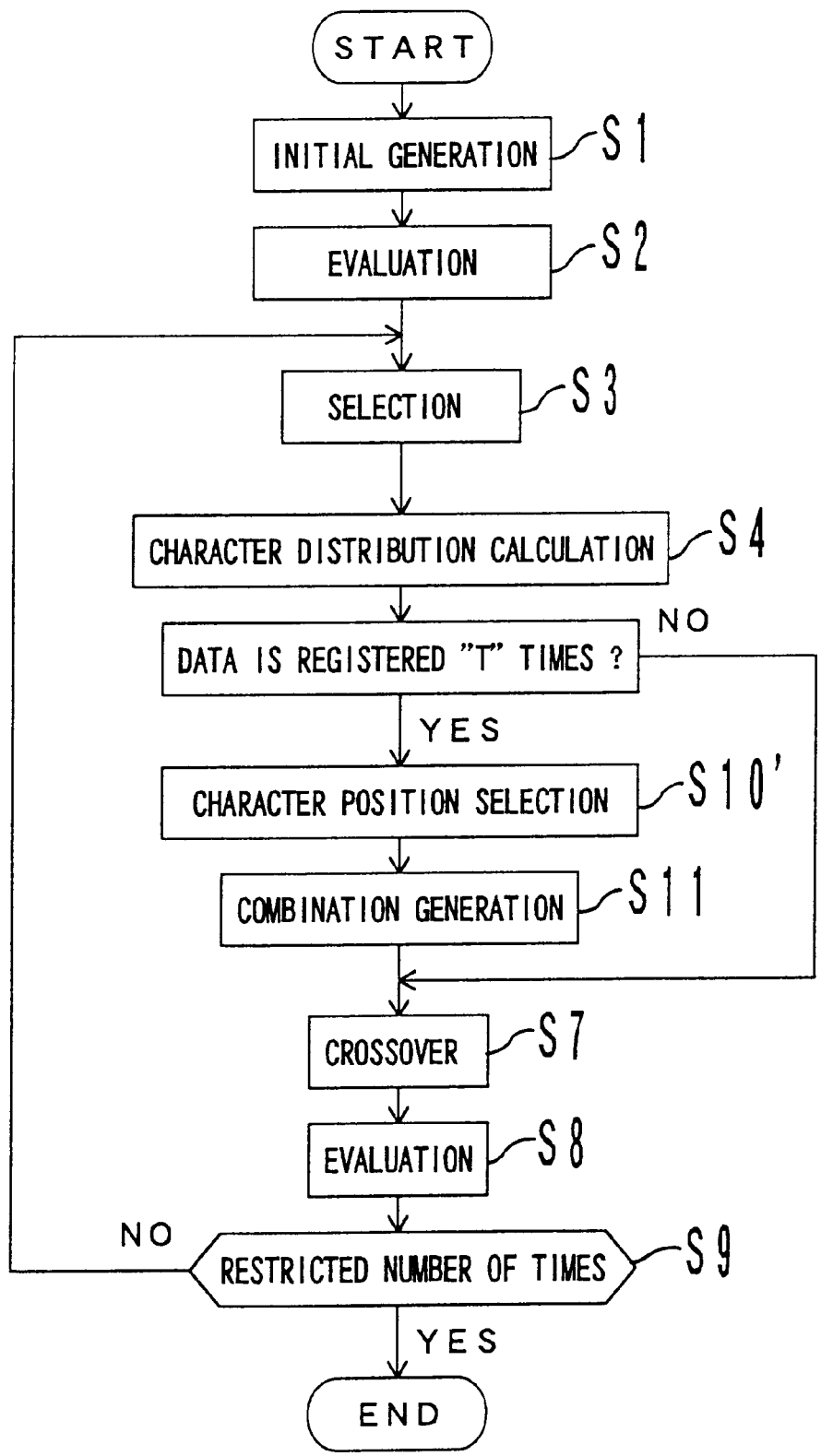
FIG. 19 is a flowchart showing the third example of the genetic algorithm executing process according to the present invention.

FIG. 19 is a flowchart showing the third example of the genetic algorithm executing device according to the present invention. In this example, distributions of characters during T generations are saved in the unit 6, and steps S10' and S11 are performed every T generations by the averaged distribution over T generations. In step S10', the unit 4 obtains rj, and selects j's for which rj is higher than a threshold value. To show the implementation example, we apply this to the knapsack problem shown in FIG. 13. The unit 6 saves pj(a) during T=2 generations and calculates the average p'j(a) of the first pj(a) and the second one (a=0, 1; j=1, ..., 50). rj is obtained as follows $$rj = 1 - |p'j(0) - 0.5| - |p'j(1) - 0.5|$$

then, the unit 4 selects the positions for which rj≥0.5 for j=1, ..., 50. Here, if the number of selected j's is greater than 8, we select the above 8 of the positions ranked according to their degree of disorder.

FIG. 20 shows the results of this example performed on the knapsack problem shown in FIG. 13 (corresponding to FIGS. 14A and 14B). In the tests until 100 generations, 2,230 was obtained only once, while in the test until 1,000 generations, it was obtained 8 times. The average number of generations required for 2,230 is 456.3. This result proves that the genetic algorithm process is improved in the third example in comparison with the conventional case. However the degree of improvement in the this example is less than that in the first example. It is thought that performance is highly dependent on a given problem.

Provided next is the explanation about the genetic algorithm executing device according to the second embodiment of the present invention. The genetic algorithm executing device according to the second embodiment is implemented by replacing the unit 13 in the configuration shown in FIG. 2A with a unit 13'. FIG. 21 shows the structure of the unit 13'. As shown in this figure, the unit 13' comprises a character-distribution calculating unit 1, a mutation rate calculating unit 2, a mutation processing unit 3, a character position selecting unit 4, a combination generating unit 5, a character distribution registering unit 6, a generation number counting unit 7, and a termination condition evaluating unit 8. Because the character-distribution calculating unit 1, the mutation rate calculating unit 2, the mutation processing unit 3, the character position selecting unit 4, the combination generating unit 5, and the character distribution registering unit 6 have the same capabilities as those shown in FIG. 2B, their explanations are omitted here. The generation number counting unit 7 comprises registers and a counter of the number of generations. The generation counter is reset to 0 by a reset signal before the generation loop, and is incremented by a countup signal every generation. The termination condition evaluating unit 8 evaluates the termination condition according to the data of the unit 1 and/or the unit 6, and the data of the unit 7. If the termination condition is satisfied, the unit 8 externally outputs a termination signal, and then the algorithm terminates.

We will abbreviate the sequence <p1(a)>, <p2(a)>, ..., <pL(a)> to {pj(a)} here. In the process according to this embodiment, the functions E1, E2, ..., EM of {pj(a)} and the number of generations t are required. The termination condition is estimated by the logical combination of inequalities such as E1({pj(a)}, t)<e1, E2({pj(a)}, t)>e2, ..., etc., where e1, e2, eM are constant threshold values.

Provided next is the explanation about the process performed by the genetic algorithm executing device according to the second embodiment. FIG. 22 is a flowchart showing the flow of the process. In this process, steps S1 and S2 correspond to steps S1 and S2 of FIG. 3 and 9, and steps S3-1 to S3-N, S4-1 to S4-N, and S8-1 to S8-N correspond to steps S3, S4, and S8 of FIG. 3 and 9 respectively. Therefore, their explanations are omitted here. Additionally, steps S12-1 to S12-N are the process implemented by combining steps S5, S6, and S7 of FIG. 3. Initial strings are generated by the unit 11 in step S1. After the evaluation value of each string was obtained in step S2, the generation number counter included in the unit 7 is reset to 0 in step S13. After strings were selected by the unit 12 in step S3-1, the distributions of characters are calculated by the unit 1 in step S4-1. Furthermore, they are registered in the unit 6. Next, the recombination process is performed in step S12-1. In this recombination process, calculation of mutation rates by the unit 2, mutation by the unit 3, and crossover by the unit 14 are performed. Next, the evaluation value of each string is obtained in step S8-1. The generation number counter is then incremented by the unit 7 in step S14-1. Then, the unit 8 estimates the termination condition 1. If it is not satisfied, the process goes back to step S3-1. If it is satisfied, the process goes to step S3-2. Then the processes in steps S3-2 to S9-2, ..., in steps S3-N to S9-N performed sequentially, and the unit 8 evaluates each of termination conditions 2 to N. The algorithm is completed when the termination condition N is satisfied.

Provided next is the explanation about the process performed by the genetic algorithm executing device according to the second embodiment. Implementation test was performed on the knapsack problem shown in FIG. 13, where the following two termination conditions were used:

Termination Condition 1: t>10

Termination Condition 2:

$$(1/50) \epsilon_j(20-19 \times |p_j(0)-0.5| 19 \times |p_j(1)-0.5|) \leq 1.3$$

The same process as that shown in FIG. 3 is performed until 10th generation, because the termination condition 1 is used. After the 11th generation, the termination condition 2 is used.

Provided next is the explanation about the result of the above described algorithm execution process. FIG. 23 shows the results for this example. As shown in this figure, 2,230 was obtained every time. The largest value of the termination generation was 334, and the average was 142.6. In comparison with 1,000 generations, these values are quite small. That is, idling time was saved in this case.

Figure 24:
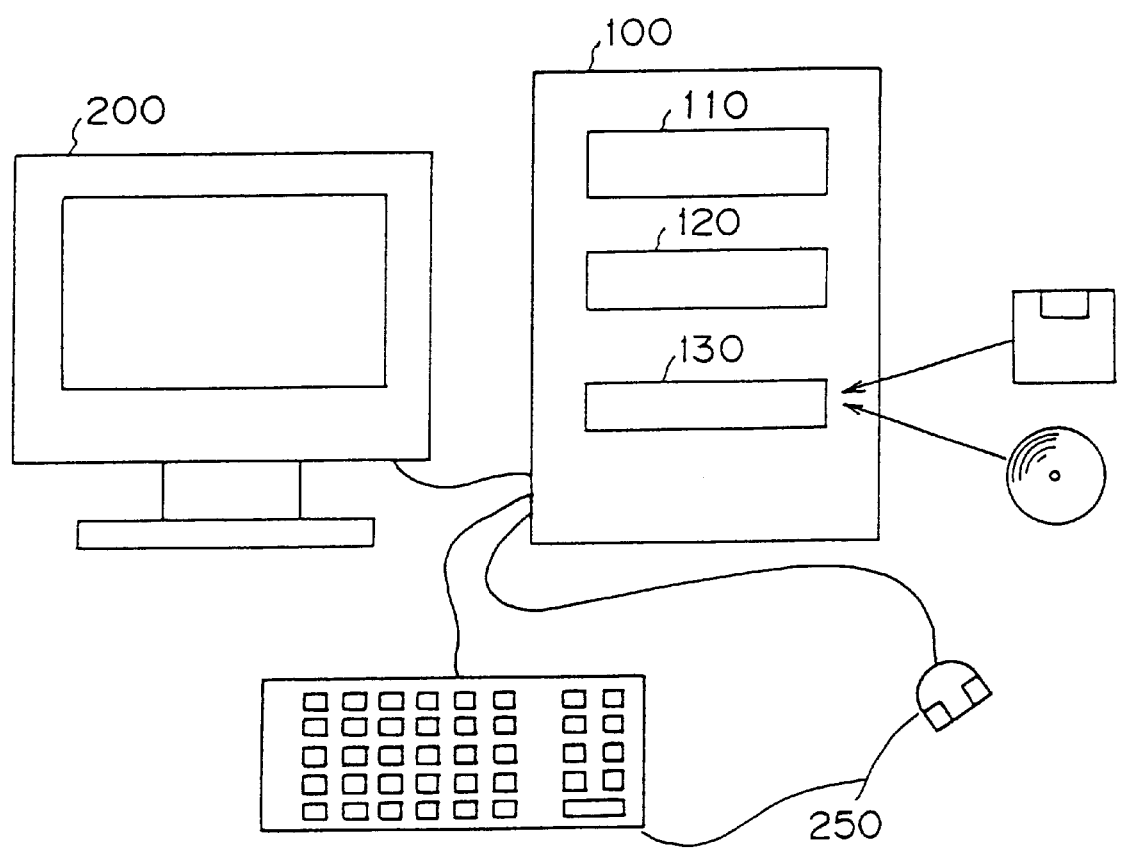
FIG. 24 is a schematic diagram showing a computer system for realizing the genetic algorithm executing device according to the present invention.

FIG. 24 exemplifies a computer system for realizing the genetic algorithm executing device according to the present invention (the devices shown in FIG. 2A, 2B, and 21), which is used to execute computer programs for performing the processes shown in FIGS. 3, 7 to 12, 19, and 22. This computer system comprises a computer body 100, a display 200, and an input device 250 composed of a keyboard and a mouse. The computer body 100 comprises a processor 110, a memory 120, and a driver 130 for a storage medium. The processor 110 performs the operations of the initial string generating unit 11, the selection processing unit 12, the crossover processing unit 14, and the search efficiency improving unit 13, which are shown in FIG. 2A, and further performs the operations of the character-distribution calculating unit 1, the mutation rate calculating unit 2, the mutation processing unit 3, the character-position selecting unit 4, the combination generating unit 5, the generation counting unit 7, and the termination condition evaluating unit 8, which are shown in FIGS. 2B and 21. Specifically, these operations are implemented by performing the processes shown in FIGS. 3, 7 to 12, 19, and 22 with a computer program. The memory 120 stores the data required for executing the computer program (such as strings, evaluation function, thresholds, etc.), and the data obtained by executing the program (distributions of characters, evaluation values, degrees of disorder, mutation rates, the number of generations, new strings, etc.). The memory 120 also serves as the character-distribution registering unit 6. The driver 130 is intended to read a program and data stored in an external storage medium to the processor 110 and the memory 120. If the computer program for executing the processes according to the present invention is stored in an external storage medium, the program stored in the external storage medium is read and executed via the driver 130. The input device 250 is used by a user in order to input the data and instructions required for executing the program.

When the computer program for executing the processes according to the present invention is stored in an external storage medium, it may be realized by an optical storage medium such as a CDROM, a magnetic storage medium such as a floppy disk, a magnetooptical storage medium such as an MD, etc. Furthermore, the computer program for executing the processes according to the present invention may be stored in an internal storage medium such as a hard disk, a ROM, a RAM, etc.

According to the present invention, the search efficiency of the genetic algorithm is improved in comparison with the conventional method especially in the large scale problems. Furthermore, calculation time is saved by automatic termination of the algorithm.

What is claimed is:

1. A genetic algorithm executing device for solving an optimization problem based on a genetic algorithm, comprising:

character-distribution-calculating means for calculating a distribution of characters for each position among character strings which represent candidates of solution;

mutation-rate-calculating means for obtaining a degree of disorder for each position by using the distribution of characters, and setting a mutation rate for each position based on the obtained degree of disorder; and mutation-processing means for performing a mutation operation on a character string according to the mutation rates to generate a new character string.

2. The genetic algorithm executing device according to claim 1, wherein
said mutation-rate-calculating means sets the mutation rate, at a position in the string, which is calculated by one of two rules that a larger mutation rate is set for a position with a higher degree of disorder and that a smaller mutation rate is set for a position with a lower degree of disorder.

3. The genetic algorithm executing device according to claim 1,
further comprising character-distribution-registering means for registering the distribution of characters calculated by said character-distribution-calculating means, wherein
said mutation-rate-calculating means obtains the degree of disorder based on the distribution of characters registered in said character-distribution-registering means.

4. The genetic algorithm executing device according to claim 1, further comprising:
generation-number-counting means for counting the generation number of character strings; and
termination-condition-evaluating means for determining whether or not to terminate a calculation process according to the genetic algorithm by using at least one of the distribution of characters obtained by said character-distribution-calculating means and a count-value counted by said generation-number-counting means.

5. The genetic algorithm executing device according to claim 4, wherein
said termination-condition-evaluating means terminates the calculation process according to the genetic algorithm when a degree of disorder of a distribution of characters calculated by said character-distribution-calculating means is determined to be equal to or lower than a predetermined value.

6. A genetic algorithm executing device solving an optimization problem according to a genetic algorithm, comprising:
a character-distribution-calculating unit calculating a distribution of characters for each position among character strings which represent candidates of solution;
a character-position-selecting unit obtaining a degree of disorder for each position by using the distribution of characters, and selecting a position for which the degree of disorder is higher than a predetermined value; and
a combination-generating unit generating a new character string by changing a character at the selected position and by fixedly setting a character to an original character or a character having a largest degree of disorder at a non-selected position.

7. The genetic algorithm executing device according to claim 6, wherein
said combination-generating unit generates all combinations of the character strings in which a character at the selected position is replaced with an available character for each of the character strings, and selects character strings of which evaluation values are large among the combinations to generate new character strings.

8. The genetic algorithm executing device according to claim 6, further comprising:
a character-distribution registering unit registering the distributions of characters calculated by said character-distribution calculating unit, wherein
said character-position-selecting unit obtains the degrees of disorder based on the distributions of characters registered in said character-distribution-registering unit.

9. The genetic algorithm executing device according to claim 6, wherein if the number of positions of which degrees of disorder are higher than the predetermined value is larger than a predetermined number, said character-position-selecting unit selects the predetermined number of positions from the positions ranked according to the degree of disorder.

10. The genetic algorithm executing device according to claim 6, further comprising:
a generation-number-counting unit counting the generation number of the character strings; and
a termination-condition-evaluating unit determining whether or not to terminate the calculation process of the genetic algorithm by using at least either the distributions of characters obtained by said character-distribution-calculating unit, or a count-value counted by said generation-number-counting unit, or both.

11. The genetic algorithm executing device according to claim 10, wherein said termination-condition-evaluating unit terminates the calculation process of the genetic algorithm when a degree of disorder of distributions of characters calculated by said character-distribution-calculating unit is determined to be equal to or lower than a predetermined value.

12. A genetic algorithm executing method for solving an optimization problem according to a genetic algorithm, comprising:
calculating a distribution of characters for each position for character strings which represent candidates of solution;
obtaining a degree of disorder for each position by using the distribution of characters;
setting a mutation rate for each position based on the obtained degree of disorder; and
performing a mutation operation on a character string according to the mutation rates to generate a new character string.

13. The genetic algorithm executing method according to claim 12, wherein:
the mutation rate is set, in the operation of setting the mutation rate, according to one of two rules that a larger mutation rate is set for a position with a higher degree of disorder and that a smaller mutation rate is set for a position with a lower degree of disorder.

14. The genetic algorithm executing method according to claim 12,
further comprising the operation of registering a calculated distribution of characters, wherein
the degree of disorder is obtained on the basis of the registered distribution of characters in the operation of obtaining the degree of disorder.

15. The genetic algorithm executing method according to claim 12, further comprising:
counting the number of generations of character strings; and
determining whether or not to terminate the calculation process according to the genetic algorithm by using at least either the distributions of characters, or a count-value of the number of generations, or both.

16. The genetic algorithm executing method according to claim 15, wherein a calculation process according to the genetic algorithm is terminated if a degree of disorder is equal to or lower than a predetermined value, in the operation of determining whether or not to terminate the calculation process.

17. A genetic algorithm executing method for solving an optimization problem according to a genetic algorithm, comprising:

calculating a distribution of characters for each position of character strings which represent candidates of solution;

obtaining a degree of disorder for each position of the strings by using the distribution of characters;

selecting a position of which the degree of disorder is higher than a predetermined value; and generating a new character string by changing a character at the selected position and by fixedly setting a character to an original character or a character having a largest degree of disorder at a non-selected position.

18. The genetic algorithm executing method according to claim 17, wherein, in the generating operation, all combinations of character strings in which a character at the selected position is replaced with an available character are generated for each of the character strings, and the new character strings are generated by selecting character strings of which the evaluation values are large from the generated combinations.

19. The genetic algorithm executing method according to claim 17, further comprising:

registering the calculated distributions of characters, wherein the degree of disorder for the selected position is obtained on the basis of the registered distributions of characters.

20. The genetic algorithm executing method according to claim 17, wherein if the number of positions of which the degrees of disorder are higher than the predetermined value is larger than a predetermined number, then a predetermined number of positions are selected from the positions ranked according to the degree of disorder, in the selecting operation.

21. The genetic algorithm executing method according to claim 17, further comprising:

counting the number of generations of the character strings; and determining whether or not to terminate the calculation process according to the genetic algorithm by using at least either the distributions of characters, or a count-value of the number of generations, or both.

22. The genetic algorithm executing method according to claim 21, wherein in the determining operation the calculation process according to the genetic algorithm is terminated if a degree of disorder of distributions of characters is equal to or lower than a predetermined value.

23. A computer-readable storage medium storing a computer program for implementing a genetic algorithm executing method for solving an optimization problem according to a genetic algorithm, the genetic algorithm executing method comprising:

calculating a distribution of characters for each position among character strings which represent candidates of solution;

obtaining a degree of disorder for each position by using the distribution of characters;

setting a mutation rate for each position based on the obtained degree of disorder; and performing a mutation operation on a character string according to the mutation rates to generate a new character string.

24. A computer-readable storage medium storing a computer program for implementing a genetic algorithm executing a method for solving an optimization problem according to a genetic algorithm, the genetic algorithm executing method comprising:

calculating a distribution of characters for each position among character strings which represent candidates of solution;

obtaining a degree of disorder for each position by using the distribution of characters;

selecting a position for which the degree of disorder is larger than a predetermined value; and generating a new character string by changing a character at the selected position and by fixedly setting a character to an original character or a character having a largest degree of disorder at a non-selected position.

25. A genetic algorithm executing device solving an optimization problem based on a genetic algorithm, comprising:

a character-distribution-calculating unit calculating a distribution of characters for each position among character strings which represent candidates of solution;

a mutation-rate-calculating unit obtaining a degree of disorder for each position by using the distribution of characters, and setting a mutation rate for each position based on the obtained degree of disorder; and a mutation-processing unit performing a mutation operation on a character string according to the mutation rates to generate a new character string.

26. A genetic algorithm executing device for solving an optimization problem according to a genetic algorithm, comprising:

character-distribution-calculating means for calculating a distribution of characters for each position among character strings which represent candidates of solution;

character-position-selecting means for obtaining a degree of disorder for each position by using the distribution of characters, and selecting a position for which the degree of disorder is higher than a predetermined value; and combination-generating means for generating a new character string by changing a character at the selected position and by fixedly setting a character to an original character or a character having a largest degree of disorder at a non-selected position.

* * * * *